(12) United States Patent
Matono et al.

(10) Patent No.: US 7,522,376 B2
(45) Date of Patent: Apr. 21, 2009

(54) PERPENDICULAR MAGNETIC RECORDING HEAD AND METHOD OF MANUFACTURING THE SAME

(75) Inventors: Naoto Matono, Saku (JP); Tetsuya Roppongi, Chuo-ku (JP); Norikazu Ota, Chuo-ku (JP)

(73) Assignee: TDK Corporation, Tokyo (JP)

( * ) Notice: Subject to any disclaimer, the term of this patent is extended or adjusted under 35 U.S.C. 154(b) by 373 days.

(21) Appl. No.: 10/699,802

(22) Filed: Nov. 4, 2003

(65) Prior Publication Data
US 2004/0090704 A1    May 13, 2004

(30) Foreign Application Priority Data
Nov. 11, 2002  (JP)  ............. 2002-327164

(51) Int. Cl.
*G11B 5/127*  (2006.01)
(52) U.S. Cl. ................................. 360/125.02
(58) Field of Classification Search ............ 360/125.04, 360/125.06, 125.08
See application file for complete search history.

(56) References Cited

U.S. PATENT DOCUMENTS

| 4,873,599 | A  | * | 10/1989 | Sueoka ............... 360/125.12 |
| 6,430,003 | B1 | * | 8/2002  | Sasaki ................ 360/126 |
| 2003/0223150 | A1 | * | 12/2003 | Lee ..................... 360/126 |

FOREIGN PATENT DOCUMENTS

| JP | A 6-180810   | 6/1994  |
| JP | A 2001-297409 | 10/2001 |
| JP | A-2002-008209 | 1/2002  |
| JP | A 2002-8209  | 1/2002  |
| JP | A 2002-197611 | 7/2002  |
| JP | A 2002-197615 | 7/2002  |
| JP | A-2002-197615 | 7/2002  |
| JP | A-2002-208114 | 7/2002  |

* cited by examiner

*Primary Examiner*—David D Davis
(74) *Attorney, Agent, or Firm*—Oliff & Berridge, Plc.

(57) ABSTRACT

Provided is a thin film magnetic head capable of appropriately control the flow of magnetic flux from a yoke layer to a pole layer so as to prevent information from being overwritten without intention during recording. A perpendicular recording system thin film magnetic head is formed so that a portion of a yoke layer and a portion of a pole layer are connected to each other in a connecting surface. When a large amount of the magnetic flux contained in the yoke layer flows into the pole layer through the connecting surface, the large amount of the magnetic flux is concentrated in the connecting surface, so an excessive amount of the magnetic flux is not supplied to a front end portion of the pole layer, and an appropriate amount of the magnetic flux is supplied. Therefore, by the function of concentrating the magnetic flux in the connecting surface, the flow of the magnetic flux from the yoke layer to the pole layer can be appropriately controlled, thereby information can be prevented from being overwritten without intention during recording.

2 Claims, 29 Drawing Sheets

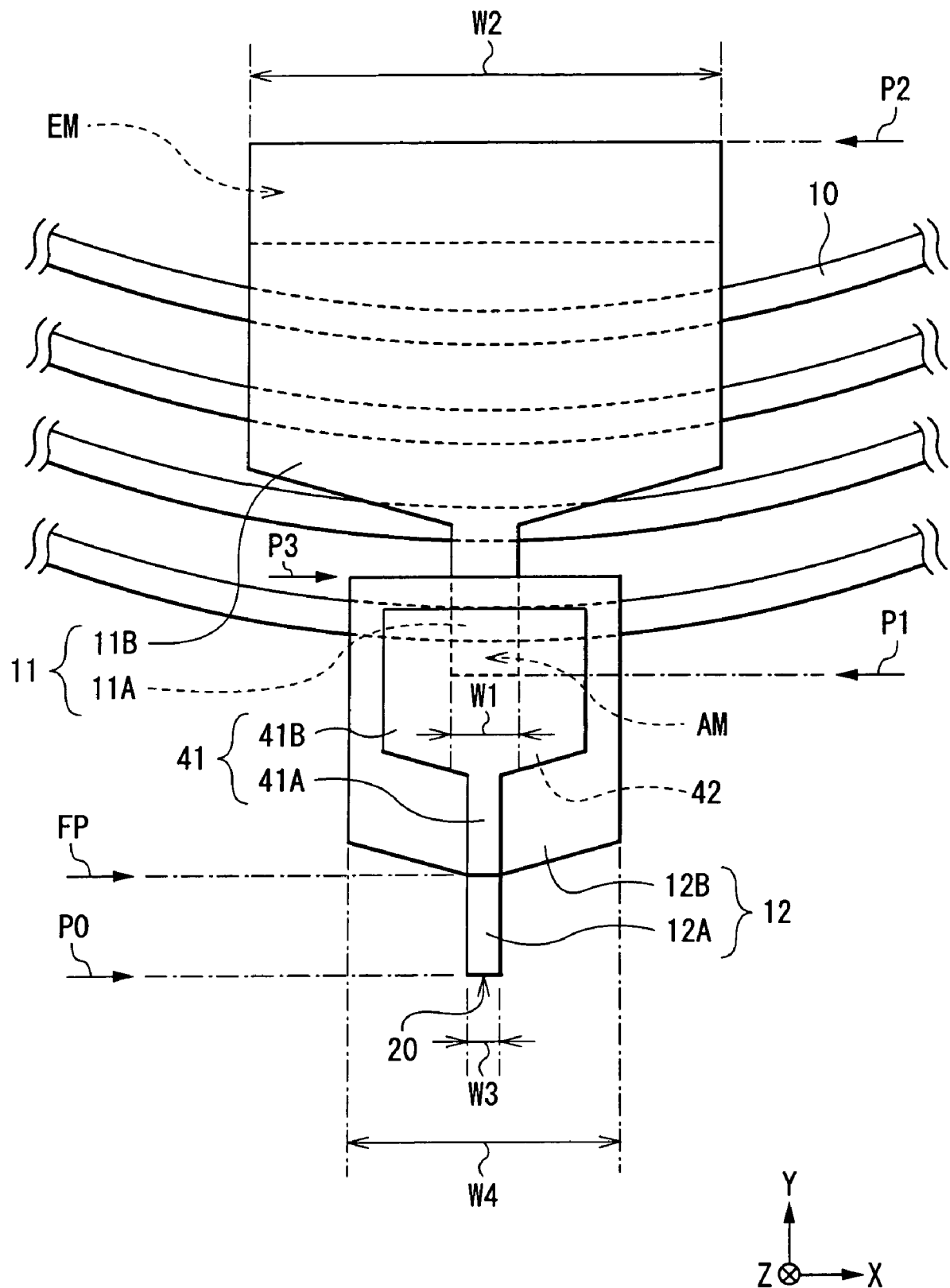
F I G. 14

PERPENDICULAR MAGNETIC RECORDING HEAD AND METHOD OF MANUFACTURING THE SAME

BACKGROUND OF THE INVENTION

1. Field of the Invention

The present invention relates to a thin film magnetic head comprising at least an inductive magnetic transducer for recording, and a method of manufacturing the same.

2. Description of the Related Art

In recent years, an improvement in performance of a thin film magnetic head has been sought in accordance with an increase in the areal density of a magnetic recording medium (hereinafter simply referred to as "recording medium") such as a hard disk or the like. As magnetic recording systems applicable to the thin film magnetic head, for example, a longitudinal recording system in which a signal magnetic field is oriented in an in-plane direction (a longitudinal direction) of a recoding medium and a perpendicular recording system in which the signal magnetic field is oriented in a direction perpendicular to a surface of the recording medium are well known. At present, the longitudinal recording system is widely used, but in consideration of market forces in accordance with an improvement in areal density, it is assumed that the perpendicular recording system instead of the longitudinal recording system holds promise for future, because the perpendicular recording system can obtain such an advantage that higher liner recording density can be achieved, and a recording medium in which data has been already recorded has resistance to thermal decay effects.

As recording modes using the perpendicular recording system, for example, (1) a mode using a head (ring type head) facing each other with a gap in between on an end side and being magnetically coupled to each other on the other end side and a recording medium having a single-layer structure as a main part, and (2) a mode using a head (single-pole type head) being disposed perpendicular to a recording medium and a recording medium having a two-layer structure as a main part have been proposed. In these modes, the mode using a combination of the single-pole type head and the recording medium having the two-layer structure becomes a focus of attention as a mode which can improve the performance of the thin film magnetic head, because the mode has remarkably superior resistance to thermal decay.

As the single-pole type thin film magnetic head using the perpendicular recording system, for example, a thin film magnetic head with a structure in which on a yoke layer disposed so that a thin film coil is covered with the yoke layer, a pole layer is disposed so as to be connected to the yoke layer is well known. The thin film coil generates magnetic flux for recording, and has a winding structure in which the thin film coil is wound around an end portion (back gap) of the yoke layer on a side farther from an air bearing surface. In the thin film magnetic head, when the magnetic flux is generated in the thin film coil, after the magnetic flux flows into the pole layer through the yoke layer, the magnetic flux is emitted from an end of the pole layer to outside. A magnetic field (perpendicular magnetic field) for recording is generated by the emitted magnetic flux, and a surface of the recording medium is selectively magnetized by the perpendicular magnetic field, so information is magnetically recorded on the recording medium.

In order to secure stable and high recording performance in the perpendicular recording system thin film magnetic head, for example, it is required to appropriately control the flow of magnetic flux from the yoke layer to the pole layer so as to prevent an excessive amount of the magnetic flux from being supplied to an end of the pole layer. It is because when the excessive amount of the magnetic flux is supplied to the end of the pole layer, thereby an unnecessary magnetic flux is emitted from a portion of the pole layer except for the end, that is, a portion around the end from which the magnetic flux should not be emitted to outside, due to a magnetic field (leakage magnetic flux) generated by the unnecessary magnetic flux, information which has been already recorded on the recording medium may be overwritten without intension.

However, in a conventional perpendicular recording system thin film magnetic head, when the flow of the magnetic flux from the yoke layer to the pole layer is not appropriately controlled, for example, depending upon conditions such as an amount of magnetic flux generated in the thin film coil, or the like, information may be overwritten without intention due to the leakage magnetic field. Such a problem exerts a large influence on reliability of the thin film magnetic head, so it is required to take immediate measures against the problem.

As in the case of the invention, some thin film magnetic heads have been already known as the thin film magnetic head for the purpose of securing stable and high recording performance.

More specifically, for example, as a thin film magnetic head capable of securing high frequency recording performance, a thin film magnetic head comprising a first magnetic member having a laminate structure in which a layer on a side closer to a write gap layer is made of a high saturation magnetic flux density material, a second magnetic member having a laminate structure in which a layer on a side closer to the write gap layer is made of a high saturation magnetic flux density material, and a third magnetic member constituting a magnetic circuit together with the first and the second magnetic members, and having a laminate structure in which an outer magnetic film is made of a high-permeability material, and an inner magnetic film is made of a high resistivity material is known (for example, refer to Japanese Unexamined Patent Application Publication No. 2001-297409). Moreover, as a thin film magnetic head capable of securing high frequency characteristics, a thin film magnetic head comprising a bottom core layer, a write gap layer, and a top core layer including a top first magnetic layer and a top second magnetic layer, and having a structure capable of processing the dimension of a track width with high precision and capable of reducing the generation of an eddy current by the shape of a connecting region between the top first and second magnetic layers is known (for example, refer to Japanese Unexamined Patent Application Publication No. 2002-8209). However, these thin film magnetic heads use the longitudinal recording system, and it is not certain whether the thin film magnetic heads can control the flow of magnetic flux in a top core layer so as to prevent information from being overwritten without intention.

Further, for example, as a perpendicular recording system thin film magnetic head capable of improving efficiency of passing magnetic flux from a yoke layer to a main pole layer, a thin film magnetic head having a structure in which a main pole layer is disposed on a inclined or curved front end surface of the yoke layer is known (for example, refer to Japanese Unexamined Patent Application Publication No. 2002-197611). In the thin film magnetic head, the main pole layer can be appropriately plated in a predetermined shape, and the efficiency of passing the magnetic flux from the yoke layer to the main pole layer can be improved. However, in the thin film magnetic head, by improving the efficiency of passing the magnetic flux from the yoke layer to the main pole layer, the flow of magnetic flux is controlled in order to reduce the leakage of the magnetic flux from the yoke layer to outside. Therefore, in the thin film magnetic head, the flow of the magnetic flux is not controlled in order to reduce the leakage of the magnetic flux from a portion around an end of the main pole layer to outside.

Moreover, for example, as a perpendicular recording system thin film magnetic head capable of improving signal quality of a reproducing waveform, a thin film magnetic head comprising a main pole, a coil for excitation and a return yoke of which a portion facing the main pole is cut away is known (for example, refer to Japanese Unexamined Patent Application Publication No. Hei 6-180810). However, it is not certain whether the thin film magnetic head can control the flow of the magnetic flux in the main pole so as to prevent information from being overwritten without intention.

For example, as a perpendicular recording system thin film magnetic head capable of appropriately guiding magnetic flux induced from a coil layer to an end surface of a main pole layer, a thin film magnetic head comprising an auxiliary pole layer, a main pole layer disposed on a flat insulating layer, and a yoke layer disposed on the main pole layer, and having a structure in which the width of a front end surface of the main pole layer gradually increases in a track width direction with distance from the auxiliary pole layer is known (for example, refer to Japanese Unexamined Patent Application Publication No. 2002-197615). However, it is not certain whether the thin film magnetic head can control the flow of the magnetic flux in the main pole layer so as to prevent information from being overwritten without intention.

SUMMARY OF THE INVENTION

In view of the foregoing, it is a first object of the invention to provide a thin film magnetic head capable of appropriately control the flow of magnetic flux from a yoke layer to a pole layer so as to prevent information from being overwritten without intention during recording.

Moreover, it is a second object of the invention to provide a method of easily manufacturing the thin film magnetic head of the invention.

A thin film magnetic head according to the invention comprises: a yoke layer disposed so as to be recessed from a recording-medium-facing surface facing a recording medium moving in a predetermined direction of medium movement; and a pole layer disposed on a medium-outgoing side of the yoke layer in the direction of medium movement so as to be exposed to the recording-medium-facing surface, wherein a portion of the pole layer is connected to a portion of the yoke layer.

A method of manufacturing a thin film magnetic head according to the invention comprises the steps of: forming a yoke layer so as to be recessed from a recording-medium-facing surface facing a recording medium moving in a predetermined direction of medium movement; and forming a pole layer on a medium-outgoing side of the yoke layer in the direction of medium movement so as to be exposed to the recording-medium-facing surface, wherein a portion of the pole layer is connected to a portion of the yoke layer.

In the thin film magnetic head or the method of manufacturing a thin film magnetic head according to the invention, a portion of the pole layer is connected to a portion of the yoke layer, so when a large amount of magnetic flux contained in the yoke layer flows into the pole layer, the large amount of the magnetic flux is concentrated.

In the thin film magnetic head according to the invention, the yoke layer may extend from a first position recessed from the recording-medium-facing surface to a second position at the rear of the first position, and the pole layer may extend from the recording-medium-facing surface to the second position, and may have a smaller width than the width of the yoke layer.

Moreover, in the thin film magnetic head according to the invention, the yoke layer may extend from a first position recessed from the recording-medium-facing surface to a second position at the rear of the first position, and the pole layer may extend from the recording-medium-facing surface to a third position between the first position and the second position. In the thin film magnetic head, the yoke layer may include a connecting portion having a part connected to the pole layer, and a yoke widening portion having a larger width than the width of the connecting portion. In this case, specifically, it is preferable that the thin film magnetic head further comprises a thin film coil generating magnetic flux, and having a winding structure wound around an end portion of the yoke layer on a side farther from the recording-medium-facing surface, wherein assuming an area of an end surface of the end portion in the yoke layer is SE, and an area of a sectional surface of the connecting portion parallel to the recording-medium-facing surface is SD, an area ratio SD/SE is within a range of $0.008 \leq SD/SE \leq 0.3$.

Moreover, in the thin film magnetic head according to the invention, a recession is preferably disposed in at least a part of a portion of the yoke layer except for a portion connected to the pole layer.

Further, in the thin film magnetic head according to the invention, the pole layer may include a uniform width portion being exposed to the recording-medium-facing surface, and having a uniform width determining a recording track width of the recording medium, and a pole widening portion having a larger width than the width of the uniform width portion.

Moreover, the thin film magnetic head according to the invention may further comprise an auxiliary pole layer disposed on the medium-outgoing side of the pole layer so as to be recessed from the recording-medium-facing surface.

Further, in the thin film magnetic head according to the invention, the pole layer preferably emits magnetic flux for magnetizing the recording medium in a direction perpendicular to a surface of the recording medium.

In the method of manufacturing a thin film magnetic head according to the invention, the step of forming the yoke layer may include the steps of: forming a precursor yoke layer pattern; forming a precursor pole layer so that the precursor yoke layer pattern is covered with the precursor pole layer; and forming the pole layer through etching the precursor pole layer to be patterned, and forming the yoke layer through continuously etching at least a part of a portion of the precursor yoke layer pattern except for a portion to be connected to the pole layer so as to be recessed.

Other and further objects, features and advantages of the invention will appear more fully from the following description.

BRIEF DESCRIPTION OF THE DRAWINGS

FIG. 14 is an enlarged plan view of a main part of the thin film magnetic head shown in FIGS. 13A and 13B;

DETAILED DESCRIPTION OF THE PREFERRED EMBODIMENTS

Figure 1:
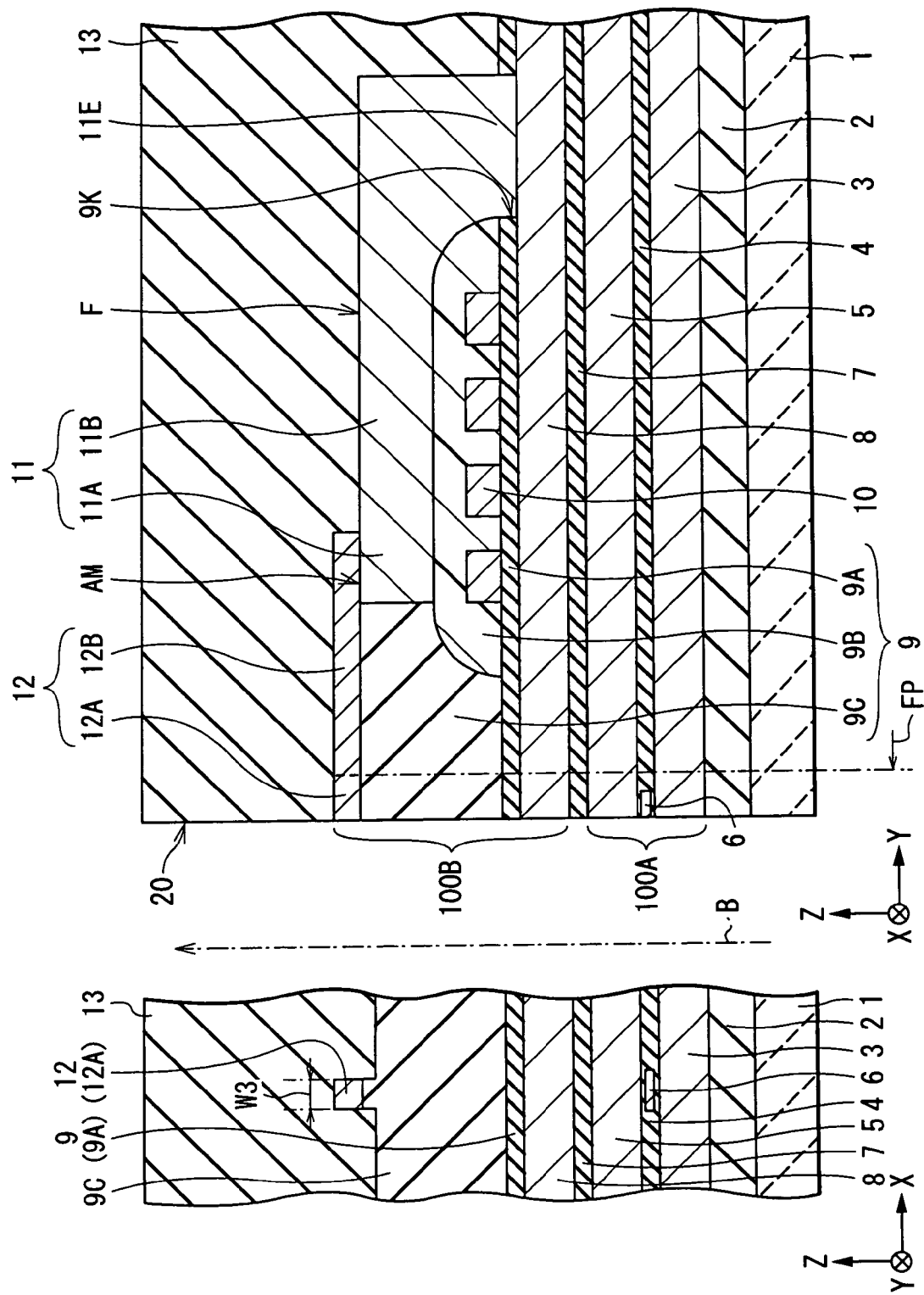
FIGS. 1A and 1B are sectional views of a thin film magnetic head according to a first embodiment of the invention.

Preferred embodiments of the invention will be described in more detail below referring to the accompanying drawings.

First Embodiment

At first, referring to FIGS. 1A and 1B, the structure of a thin film magnetic head according to a first embodiment of the invention will be described below. FIGS. 1A and 1B show sectional views of the thin film magnetic head, and FIG. 1A shows a sectional view parallel to an air bearing surface, and FIG. 1B shows a sectional view perpendicular to the air bearing surface. An up arrow B shown in FIGS. 1A and 1B indicates a direction where a recording medium (not shown) relatively moves with respect to the thin film magnetic head, that is, a direction of movement of the recording medium (direction of medium movement).

In the following description, a dimension in an X-axis direction, a dimension in a Y-axis direction and a dimension in a Z-axis direction in FIGS. 1A and 1B are expressed as "a width", "a length" and "a thickness", respectively. Further a side closer to an air bearing surface in the Y-axis direction is expressed as "front", and the opposite side is expressed as "rear". In FIGS. 2 through 30, they are expressed as the same.

The thin film magnetic head is, for example, a composite head capable of implementing two functions of recording and reproducing, and is mounted in, for example, a magnetic recording/reproducing apparatus such as a hard disk drive or the like. As shown in FIGS. 1A and 1B, the thin film magnetic head comprises an insulating layer 2 made of, for example, aluminum oxide ($Al_2O_3$; hereinafter simply referred to as "alumina"), a reproducing head portion 100A using a magnetoresistive (MR) effect to perform reproducing, a non-magnetic layer 7 made of, for example, alumina, a single pole type recording head portion 100B using a perpendicular recording system to perform recording and an overcoat layer 13 made of, for example, alumina laminated in this order on a substrate 1 made of, for example, AlTiC ($Al_2O_3 \cdot TiC$).

The reproducing head portion 100A comprises, for example, a bottom shield layer 3, a shield gap film 4 and a top shield layer 5 laminated in this order. An MR device 6 as a reproducing device is buried in the shield gap film 4 so that an end surface of the MR device 6 is exposed to a recording-medium-facing surface (air bearing surface) 20 facing a recording medium such as a hard disk or the like.

The bottom shield layer 3 and the top shield layer 5 are made of, for example, a nickel iron alloy (NiFe (for example, Ni: 80 wt %, Fe: 20 wt %); hereinafter simply referred to as "Permalloy (trade name)"), and the shield gap film 4 is made of, for example, alumina. The MR device 6 uses, for example, giant magneto-resistance (GMR), tunneling magneto-resistance (TMR) or the like to perform reproducing.

The recording head portion 100B comprises, for example, a return yoke layer 8, a thin film coil 10 for generating magnetic flux buried in a gap layer 9 having an aperture 9K, a yoke layer 11 connected to the return yoke layer 8 through the aperture 9K and a pole layer 12 connected to the yoke layer 11 laminated in this order. In the above description, the word "connected" means physically contacted and magnetically coupled. The gap layer 9 includes a gap layer portion 9A being disposed on the return yoke layer 8 and having the aperture 9K, a gap layer portion 9B disposed on the gap layer portion 9A so that gaps between windings of the thin film coil 10 and their surroundings are covered with the gap layer portion 9B, and a gap layer portion 9C disposed so that the thin film coil 10 is covered with the gap layer portion 9C together with the gap layer portions 9A and 9B. The pole layer 12 is disposed on a flat surface F formed of the gap layer portion 9C and the yoke layer 11.

The return yoke layer 8, the yoke layer 11 and the pole layer 12 are made of, for example, Permalloy. In the gap layer 9, for example, the gap layer portion 9A is made of alumina, and the gap layer portion 9B is made of a photoresist (photosensitive resin) or spin-on glass (SOG), and the gap layer portion 9C is made of alumina or silicon oxide ($SiO_2$).

Figure 2:
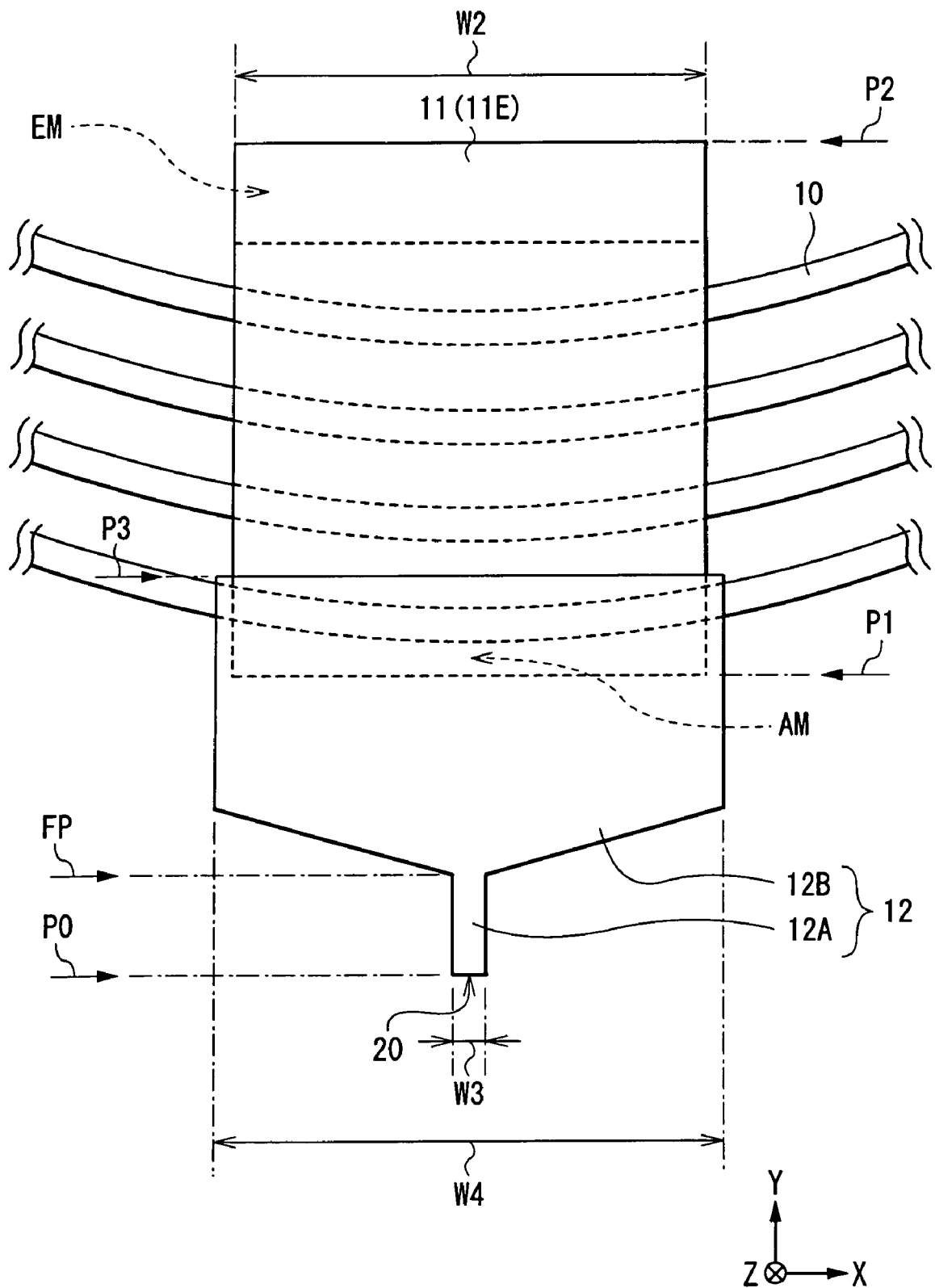
FIG. 2 is an enlarged plan view of a main part of the thin film magnetic head shown in FIGS. 1A and 1B.
Figure 3:
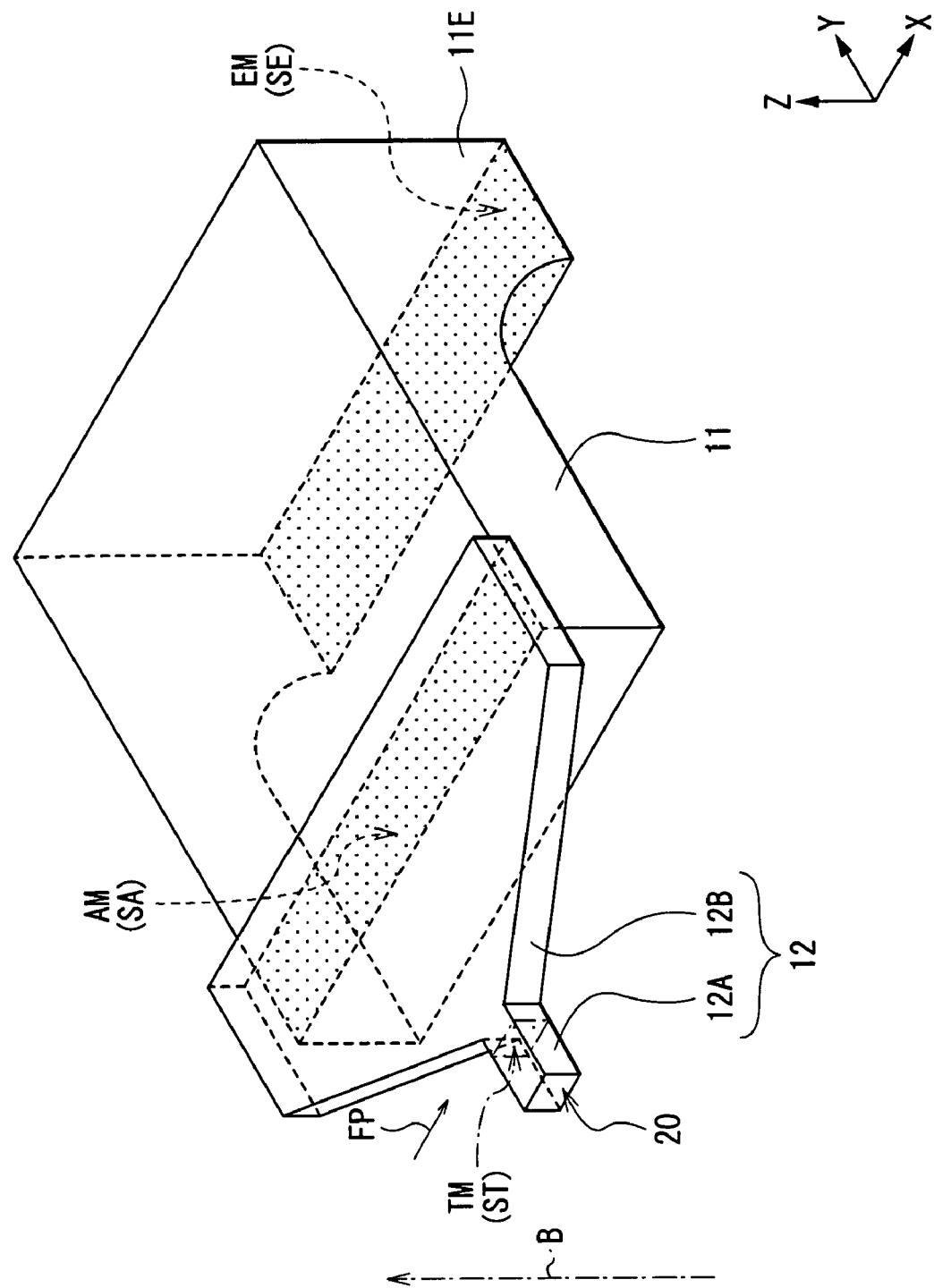
FIG. 3 is a perspective view of the main part of the thin film magnetic head shown in FIG. 2.
Figures 4A, 4B:
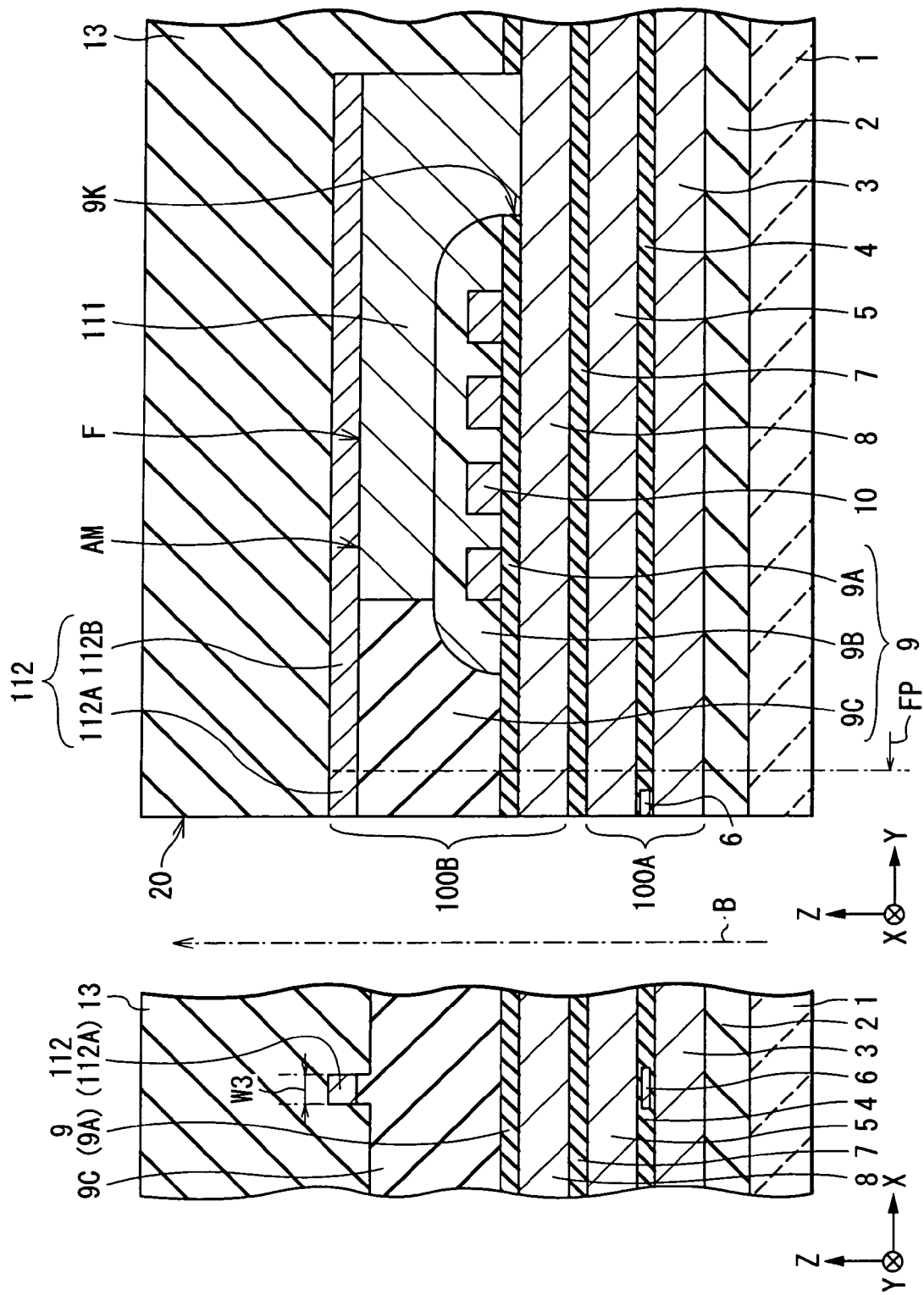
FIGS. 4A and 4B are sectional views of a thin film magnetic head as a comparative example to the thin film magnetic head according to the first embodiment of the invention.
Figure 5:
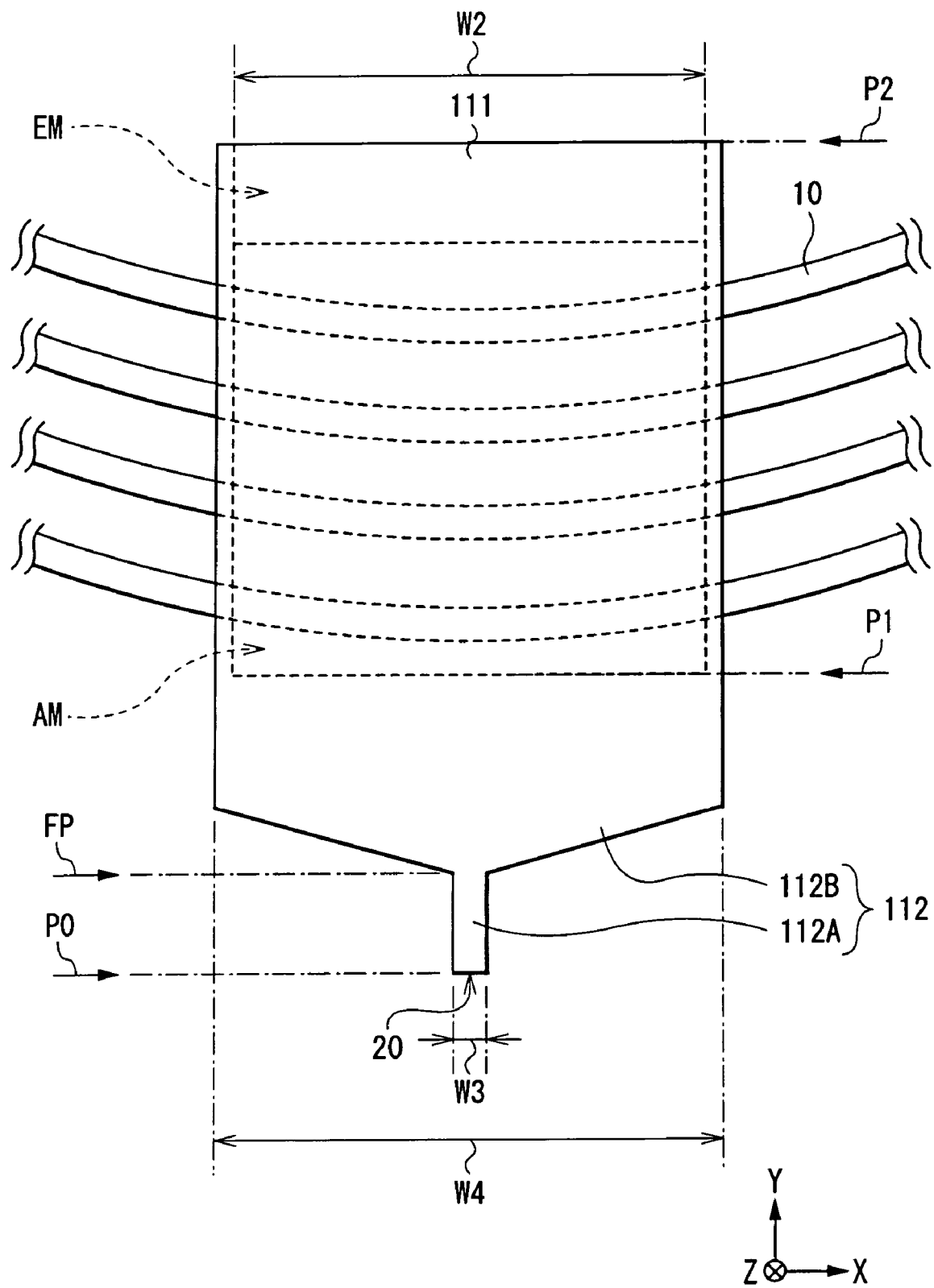
FIG. 5 is an enlarged plan view of a main part of the thin film magnetic head shown in FIGS. 4A and 4B.

Next, referring to FIGS. 1A through 3, a main part of the thin film magnetic head will be described in more detail below. FIG. 2 shows an enlarged plan view of the main part (the yoke layer 11 and the pole layer 12) of the thin film magnetic head shown in FIGS. 1A and 1B, and FIG. 3 shows a perspective view of the main part of the thin film magnetic head shown in FIG. 2.

The yoke layer 11 mainly contains magnetic flux generated in the thin film coil 10, and then supplies the magnetic flux to the pole layer 12. The yoke layer 11 is disposed so that the thin film coil 10 is covered with the yoke layer 11 and the yoke layer 11 is recessed from the air bearing surface 20. More specifically, as shown in FIG. 2, the yoke layer 11 extends from a position P1 (a first position) recessed from the air bearing surface 20 to a position P2 (a second position) at the rear of the position P1, and has a uniform width W2. In other words, the plane shape of the yoke layer 11 is, for example, a rectangular shape. As described above, an end portion (back gap) 11E of the yoke layer 11 on a side farther from the air bearing surface 20 is magnetically coupled to the return yoke layer 8, and the thin film coil 10 has a winding structure in which the thin film coil 10 is spirally wound around the end portion 11E of the yoke layer 11.

The pole layer 12 mainly emits the magnetic flux contained in the yoke layer 11 to the recording medium so as to magnetize the recording medium in a direction perpendicular to a surface of the recording medium, and is disposed so as to be exposed to the air bearing surface 20. More specifically, the pole layer 12 extends from a position P0 of the air bearing surface 20 to a position P3 (a third position) between the position P1 and the position P2. The pole layer 12 includes, for example, a front end portion 12A having a uniform width W3 determining a recording track width of the recording medium and a rear end portion 12B having a larger width W4 than the width W3 of the front end portion 12A (W4>W3) in order from the position P0 to the position P3. For example, the rear end portion 12B has a larger width W4 than the width W2 of the yoke layer 11 (W4>W2) in a rear portion thereof, and a width gradually narrowed toward the front end portion 12A in a front portion thereof. A connecting position between the front end portion 12A and the rear end portion 12B is a position where the width of the pole layer 12 is narrowed from W4 to W3, that is, a flare point FP. Herein, the front end portion 12A of the pole layer 12 corresponds to a specific example of "a uniform width portion" in the invention, and the rear end portion 12B of the pole layer 12 corresponds to a specific example of "a pole widening portion" in the invention.

As described above, the pole layer 12 is disposed on the yoke layer 11, that is, on a medium-outgoing side of yoke layer 11 in a direction B of movement of the recording medium, and a part of the rear end portion 12B in the pole layer 12 and a part of the front end portion 11A in the yoke layer 11 overlap to be connected to each other. In other words, as shown in FIG. 2, an area SA of a connecting surface AM which connects between the yoke layer 11 and the pole layer 12 is smaller than the area of the plane shape of the yoke layer 11. When the movement of the recording medium toward the direction B of movement of the recording medium is considered as a flow, the above "medium-outgoing side (or a trailing side)" means a side where the flow outgoes, and more specifically, it means an upper side in a thickness direction (Z-axis direction). On the other hand, a side where the flow incomes, that is, a lower side in the thickness direction is called "a medium-incoming side (or a leading side)". As shown in FIG. 3, assuming that an area of an end surface (an end surface magnetically coupled to the return yoke layer 8) EM of the end portion 11E in the yoke layer 11 is SE, and an area of a sectional surface (a sectional surface parallel to the air bearing surface 20) TM of the front end portion 12A in the pole layer 12 is ST, the area ST is smaller than the area SE (ST<SE). In FIG. 3, in order to distinguish the connecting surface AM, the end surface EM and the sectional surface TM from others, these surfaces are hatched.

Next, referring to FIGS. 1A through 3, actions of the thin film magnetic head will be described below In the thin film magnetic head, in recording information, when a current flows from an external circuit (not shown) to the thin film coil 10 of the recording head portion 100B, magnetic flux is mainly and intensively generated in a portion of the thin film coil 10 in proximity to the end portion 11E of the yoke layer 11. After the magnetic flux is contained in the yoke layer 11, the magnetic flux flows from the yoke layer 11 to the pole layer 12 through the connecting surface AM. When the magnetic flux flowing into the pole layer 12 flows from the rear end portion 12B to the front end portion 12A, the magnetic flux is concentrated in a width direction in the flare point FP, and then the magnetic flux is emitted from an end of the front end portion 12A to outside. A signal magnetic field for recording (perpendicular magnetic field) is generated by the emitted magnetic flux, and the recording medium is magnetized in a direction perpendicular to a surface of the recording medium by the perpendicular magnetic field, thereby information is magnetically recorded on the recording medium.

On the other hand, in reproducing, when a sense current flows into the MR device 6 of the reproducing head portion 100A, the resistance of the MR device 6 is changed depending upon a signal magnetic field for reproducing from the recording medium. A change in the resistance is detected as a change in the sense current so that the information recorded on the recording medium is read out.

Next, referring to FIGS. 1A through 3, a method of manufacturing the thin film magnetic head will be described below. In the description of the method of manufacturing the thin film magnetic head, the materials, forming positions and structural characteristics of components will not be further described, because they have been already described above.

The thin film magnetic head is manufactured through laminating each component in order mainly by use of thin film processes including film formation techniques such as plating, sputtering or the like, patterning techniques such as photolithography or the like, etching techniques such as dry etching or the like. More specifically, after the insulating layer 2 is formed on the substrate 1, the bottom shield layer 3, the shield gap film 4 burying the MR device 6, and the top shield layer 5 are laminated in this order on the insulating layer 2 so as to form the reproducing head portion 100A.

Next, after the non-magnetic layer 7 is formed on the reproducing head portion 100A, the return yoke layer 8, the gap layer 9 (9A, 9B and 9C) burying the thin film coil 10, the yoke layer 11 connected to the return yoke layer 8 through the aperture 9K disposed in the gap layer portion 9A, and the pole layer 12 connected to the yoke layer 11 are laminated in this order on the non-magnetic layer 7 so as to form the recording head portion 100B. As a method of forming the pole layer 12, the pattern growth of a plated film may be carried out, or after a magnetic layer (precursor pole layer) for forming the pole layer 12 is formed, the precursor pole layer may be etched to be patterned.

Finally, after the overcoat layer 13 is formed so that the recording head portion 100B is covered with the overcoat layer 13, the air bearing surface 20 is formed through machining or polishing so as to complete the thin film magnetic head.

In the thin film magnetic head according to the embodiment, a portion of the yoke layer 11 and a portion of the pole layer 12 are connected to each other, so the flow of the magnetic flux from the yoke layer 11 to the pole layer 12 can be appropriately controlled so as to prevent information from being overwritten without intention during recording because of the following reason.

Figure 6:
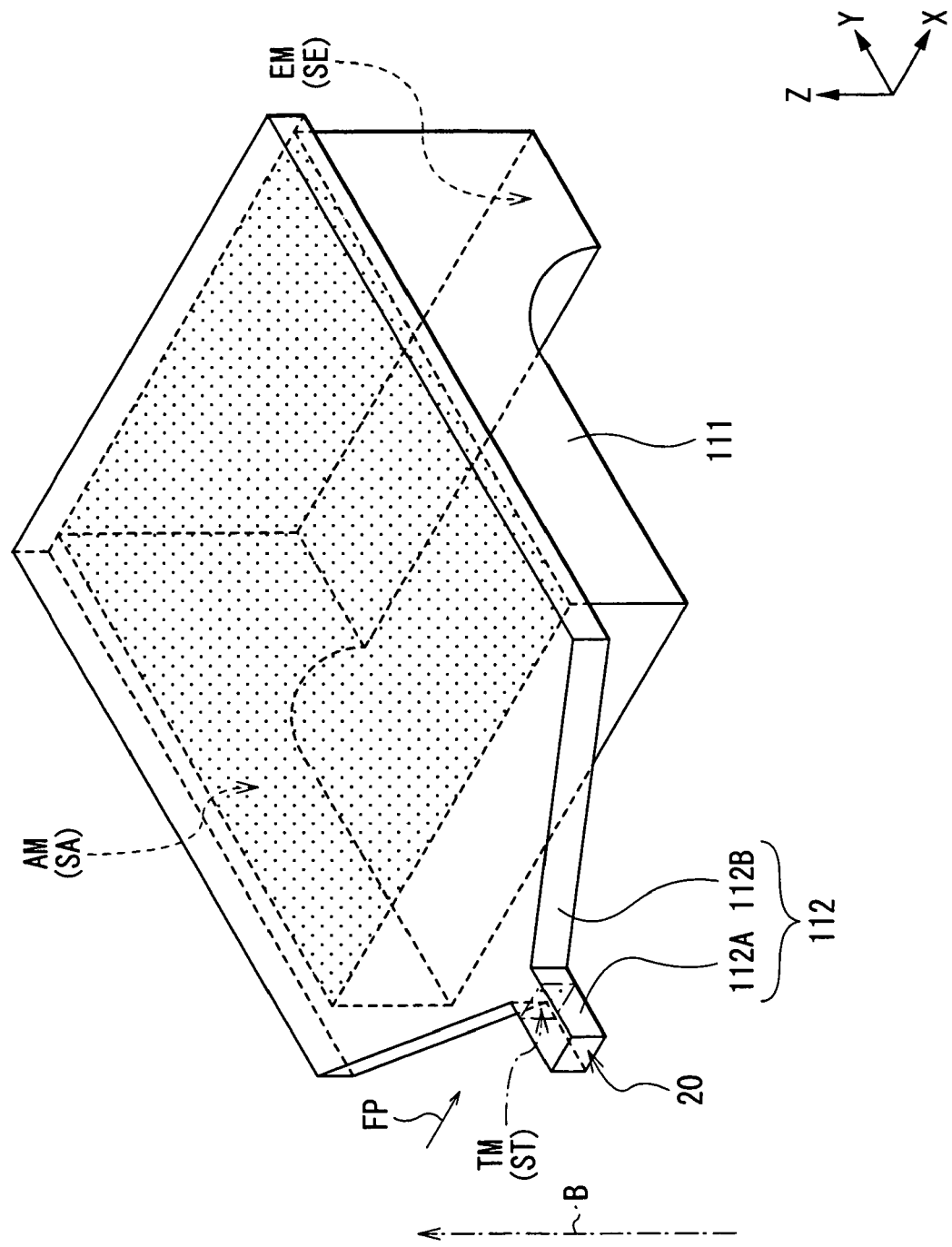
FIG. 6 is a perspective view of the main part of the thin film magnetic head shown in FIG. 5.

FIGS. 4A through 6 show the structure of a thin film magnetic head as a comparative example to the thin film magnetic head according to the embodiment, and correspond to FIGS. 1A through 3, respectively. The thin film magnetic head of the comparative example has the same structure as that according to the embodiment, except that a yoke layer 111 and a pole layer 112 (a front end portion 112A and a rear end portion 112B) corresponding to the yoke layer 11 and the pole layer 12 (the front end portion 12A and the rear end portion 12B), respectively are included, and the pole layer 112 extends from the position P0 to the position P2. In FIG. 6, the connecting surface AM is hatched.

In the comparative example, a portion of the rear end portion 112B in the pole layer 112 is connected to the whole yoke layer 111, so the area SA of the connecting surface AM connecting between the yoke layer 111 and the pole layer 112 is equal to the area of the plane shape of the yoke layer 111, that is, the area SA is maximized. In this case, the connecting surface AM which functions as an inlet when the magnetic flux flows from the yoke layer 111 to the pole layer 112 is too large, a large amount of the magnetic flux contained in the yoke layer 111 flows into the pole layer 112 through the connecting surface AM, thereby an excessive amount of the magnetic flux may be supplied to the front end portion 112A of the pole layer 112. When the excessive amount of the magnetic flux is supplied to the front end portion 112A of the pole layer 112, as described above, a leakage magnetic field is generated, and due to the leakage magnetic field, information may be overwritten during recording without intention.

On the other hand, in the embodiment, a portion of the pole layer 12 is connected to a portion of the yoke layer 11, and the area SA of the connecting surface AM connecting between the yoke layer 11 and the pole layer 12 is smaller than the area of the plane shape of the yoke layer 11, so compared to the comparative example in which a portion of the pole layer 112 is connected to the whole yoke layer 111, the area of the connecting surface AM is smaller. In this case, when a large amount of the magnetic flux contained in the yoke layer 11 flows into the pole layer 12 through the connecting surface AM, the large amount of the magnetic flux is concentrated in the connecting surface AM, so an excessive amount of the magnetic flux is not supplied to the front end portion 12A of the pole layer 12, and an appropriate amount of the magnetic flux is supplied. Therefore, in the embodiment, by using a function of concentrating the magnetic flux in the connecting surface AM, the flow of the magnetic flux from the yoke layer 11 to the pole layer 12 is appropriately controlled, thereby information can be prevented from being overwritten during recording without intention.

Moreover, in the embodiment, as long as a portion of the yoke layer 11 and a portion of the pole layer 12 are connected to each other, and the area SA of the connecting surface AM is smaller than the area of the plane shape of the yoke layer 11, thereby the flow of the magnetic flux from the yoke layer 11 to the pole layer 12 can be appropriately controlled so as to prevent information from being overwritten during recording without intention, the thin film magnetic head can be freely modified.

Figure 7:
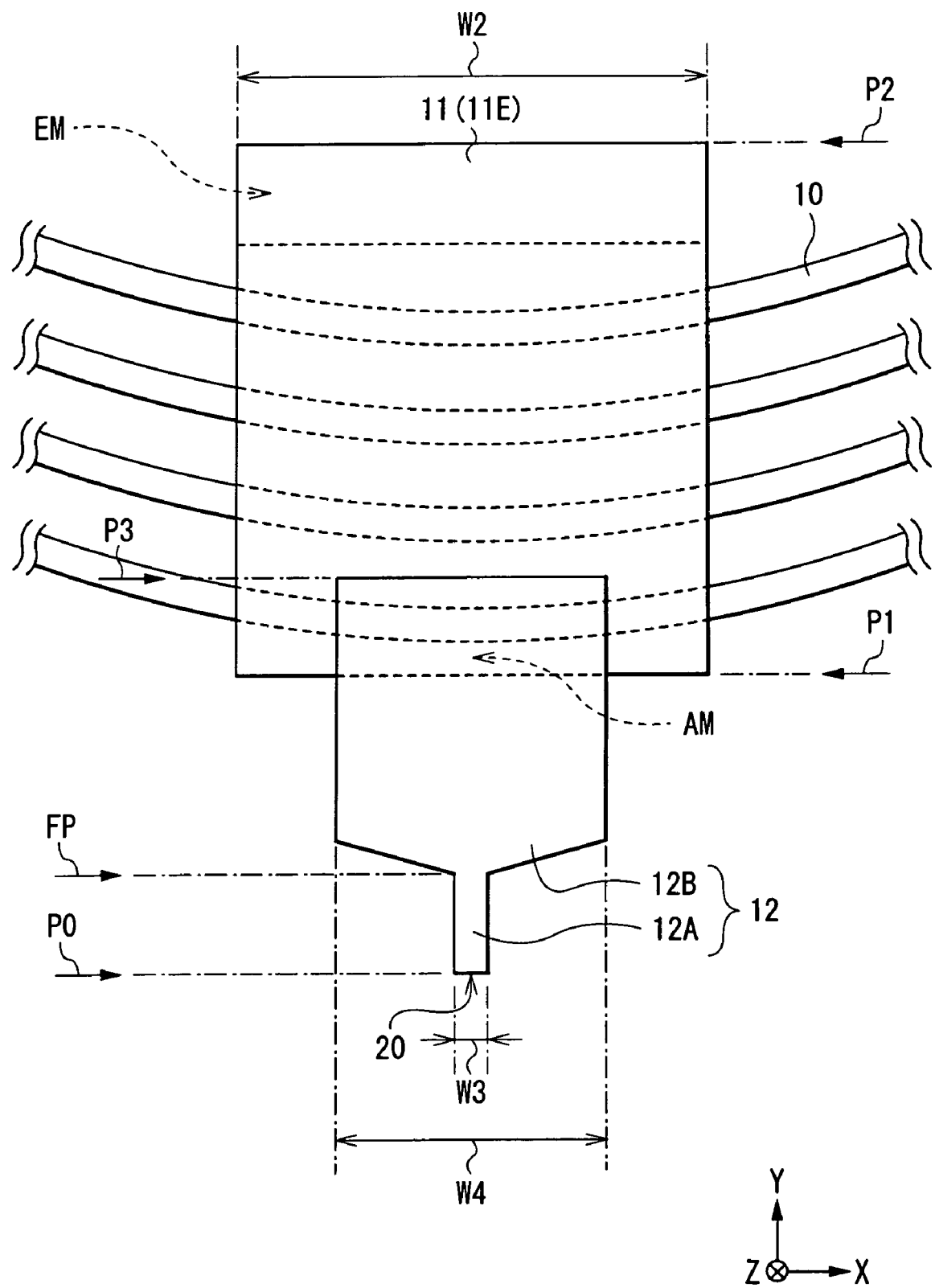
FIG. 7 is a plan view of a first modification to the main part of the thin film magnetic head according to the first embodiment of the invention.

More specifically, in the embodiment, as shown in FIG. 2, the width W4 of the rear end portion 12B in the pole layer 12 is larger than the width W2 of the yoke layer 11 (W4>W2), but it is not necessarily limited to this. For example, as shown in FIG. 7, the width W4 of the rear end portion 12B may be equal to or smaller than the width W2 of the yoke layer 11 (W4≦W2). For example, FIG. 7 shows the case where the width W4 is smaller than the width W2 (W4<W2). The structure of the thin film magnetic head shown in FIG. 7 is equivalent to that shown in FIG. 2, except for the above characteristic part.

Figure 8:
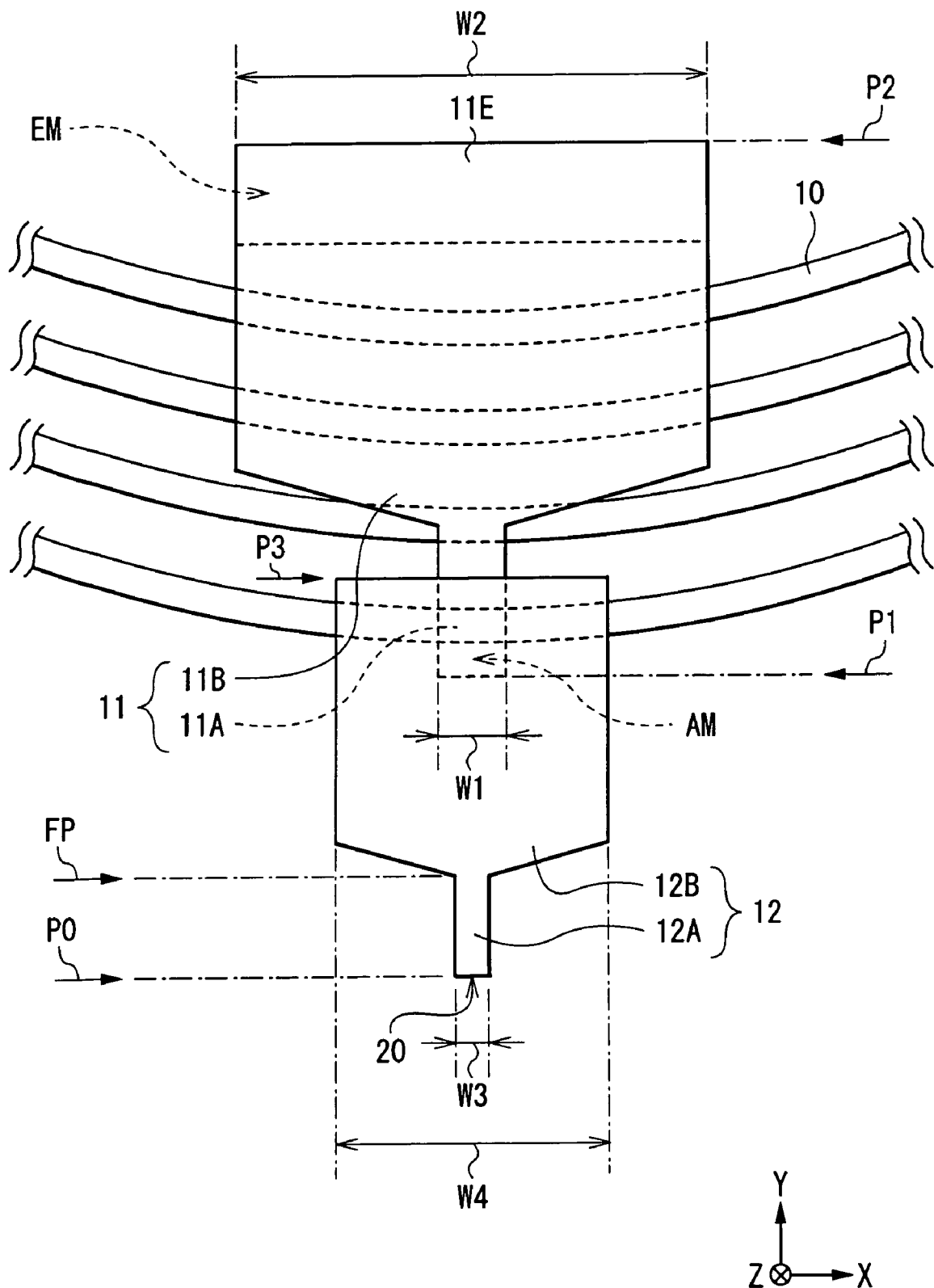
FIG. 8 is a plan view of a second modification to the main part of the thin film magnetic head according to the first embodiment of the invention.
Figure 9:
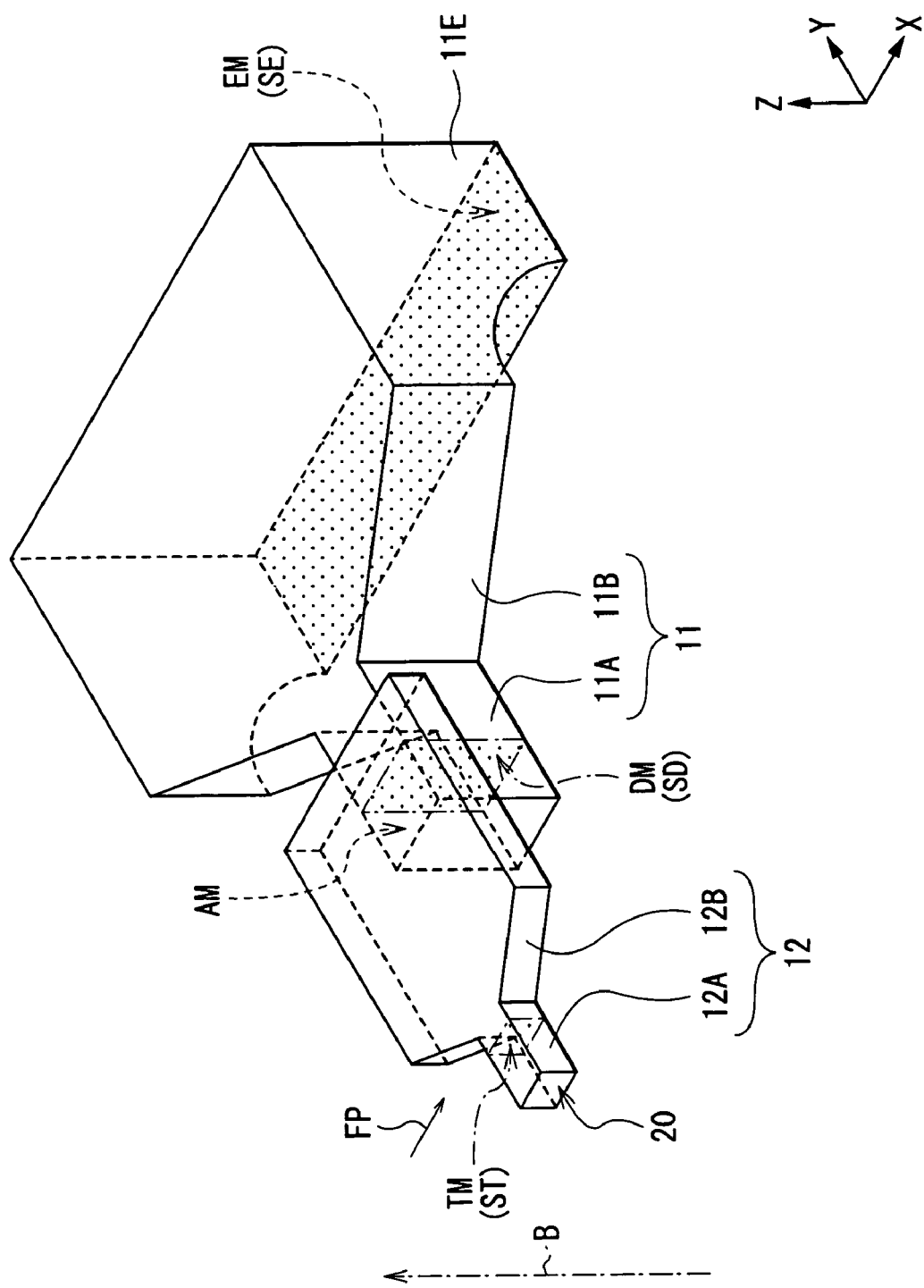
FIG. 9 is a perspective view of the main part of the thin film magnetic head shown in FIG. 8.

Moreover, in FIG. 7, the yoke layer 11 has a rectangular plane shape, but it is not necessarily limited to this. For example, as shown in FIGS. 8 and 9 corresponding to FIGS. 2 and 3, respectively, the yoke layer 11 may have a substantially T-shaped plane shape. The yoke layer 11 includes the front end portion 11A having a uniform width W1 larger than the width W3 of the front end portion 12A in the pole layer 12, and the rear end portion 11B having a width W2 larger than the width W1 of the front end portion 11A (W2>W1). The rear end portion 11B has, for example, the uniform width W2 in a rear portion of the rear end portion 11B, and in a front portion of the rear end portion 11B, the width is gradually narrowed toward the front end portion 11A. When the area of a sectional surface (sectional surface parallel to the air bearing surface 20) DM of the front end portion 11A in the yoke layer 11 is SD, the area SE, the area SD and the area ST are listed in decreasing order of area (SE>SD>ST), and more specifically, an area ratio SD/SE is preferably within a range of 0.008≦SD/SE≦0.3, more preferably within a range of 0.009≦SD/SE≦0.2. In FIG. 9, the end surface EM, the sectional surface TM and the sectional surface DM are hatched.

In the structure of the thin film magnetic head shown in FIGS. 8 and 9, based upon the characteristic structure of the yoke layer 11 having a substantially T-shaped plane shape, the flow of the magnetic flux from the yoke layer 11 to the pole layer 12 can be effectively controlled because of the following reason. The magnetic flux flowing into the yoke layer 11 is concentrated in the width direction according to a decrease in the width of the yoke layer 11 when the magnetic flux flows from the rear end portion 11B to the front end portion 11A before the magnetic flux flows into the pole layer 12 through the connecting surface AM. After the concentrated magnetic flux flows into the front end portion 11A with the uniform width W1, the magnetic flux still concentrated flows into the pole layer 12. Thereby, the magnetic flux which is concentrated in the yoke layer 11 so that the amount of the magnetic flux is appropriately controlled flows into the pole layer 12 through the connecting surface AM. Therefore, compared to the case of the embodiment in which the magnetic flux is concentrated when the magnetic flux passes through the connecting surface AM, the magnetic flux stably flows through the connecting surface AM. Accordingly, the flow of the magnetic flux from the yoke layer 11 to the pole layer 12 can be more effectively controlled. In this case, when the area ratio SD/SE is appropriately within a range of 0.008<SD/SE<0.3, while securing the perpendicular magnetic field strength, the leakage magnetic field strength can be reduced. Herein, the front end portion 11A of the yoke layer 11 corresponds to a specific example of "a connecting portion" in the invention, and the rear end portion 11B of the yoke layer 11 corresponds to a specific example of "yoke widening portion" in the invention.

Figure 10:
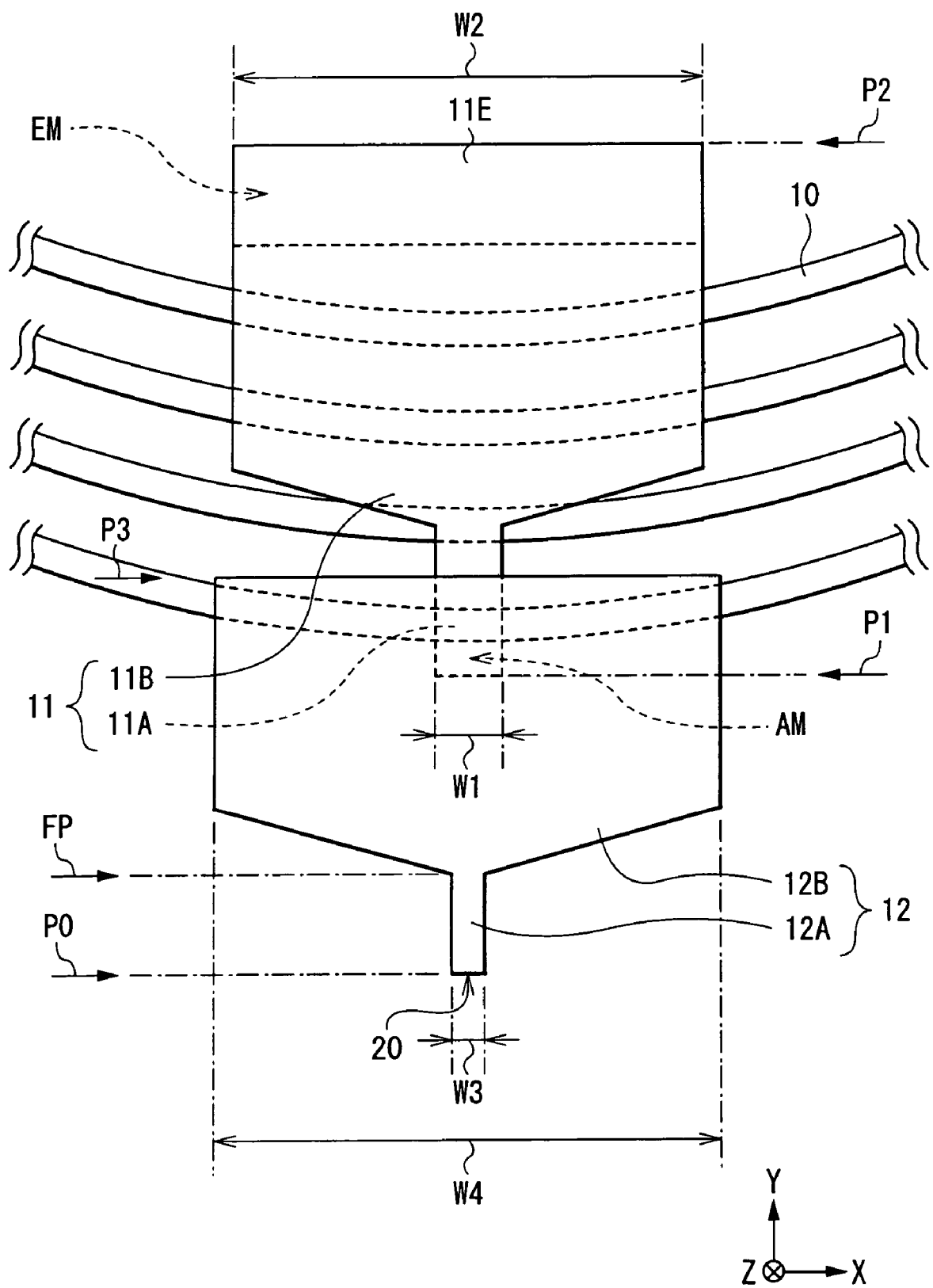
FIG. 10 is a plan view of a third modification to the main part of the thin film magnetic head according to the first embodiment of the invention.

Further, as shown in FIG. 10, a modification to the structure of the yoke layer 11 shown in FIG. 8 may be applied to the yoke layer 11 shown in FIG. 2. More specifically, in the case shown in FIG. 2, the yoke layer 11 having a rectangular plane shape may be replaced with the yoke layer 11 having a substantially T-shaped plane shape.

Figure 11:
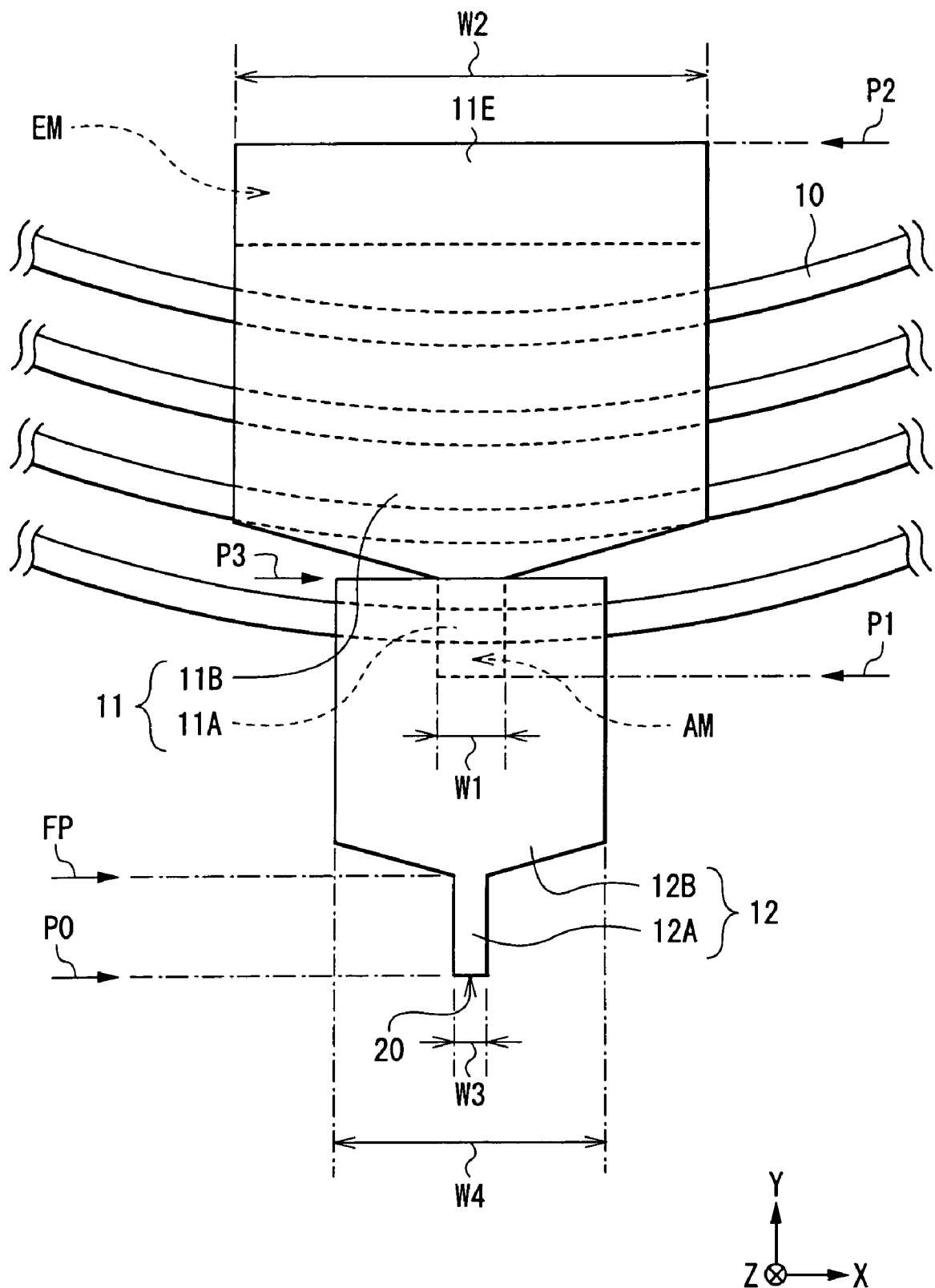
FIG. 11 is a plan view of a fourth modification to the main part of the thin film magnetic head according to the first embodiment of the invention.

Moreover, in the case shown in FIG. 8, a portion of the rear end portion 12B in the pole layer 12 is connected to a portion of the front end portion 11A in the yoke layer 11, but it is not necessarily limited to this. As long as a state where a portion of the yoke layer 11 and a portion of the pole layer 12 are coupled to each other can be secured, a connecting range of the front end portion 11A to the pole layer 12 can be freely modified. More specifically, for example, as shown in FIG. 11, a portion of the rear end portion 12B in the pole layer may be connected to the whole front end portion 11A in the yoke layer 11.

Figure 12:
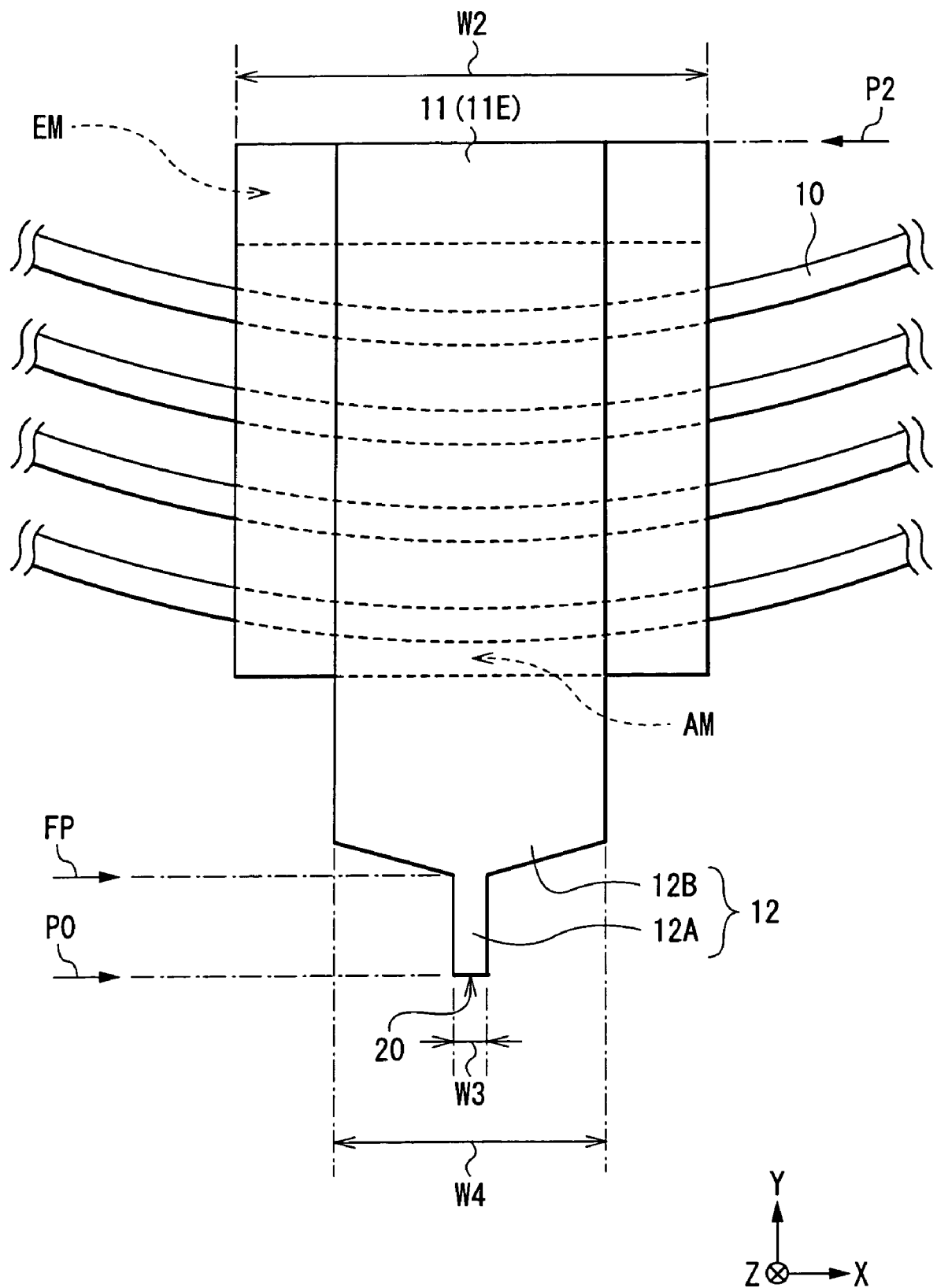
FIG. 12 is a plan view of a fifth modification to the main part of the thin film magnetic head according to the first embodiment of the invention.
Figures 13A, 13B:
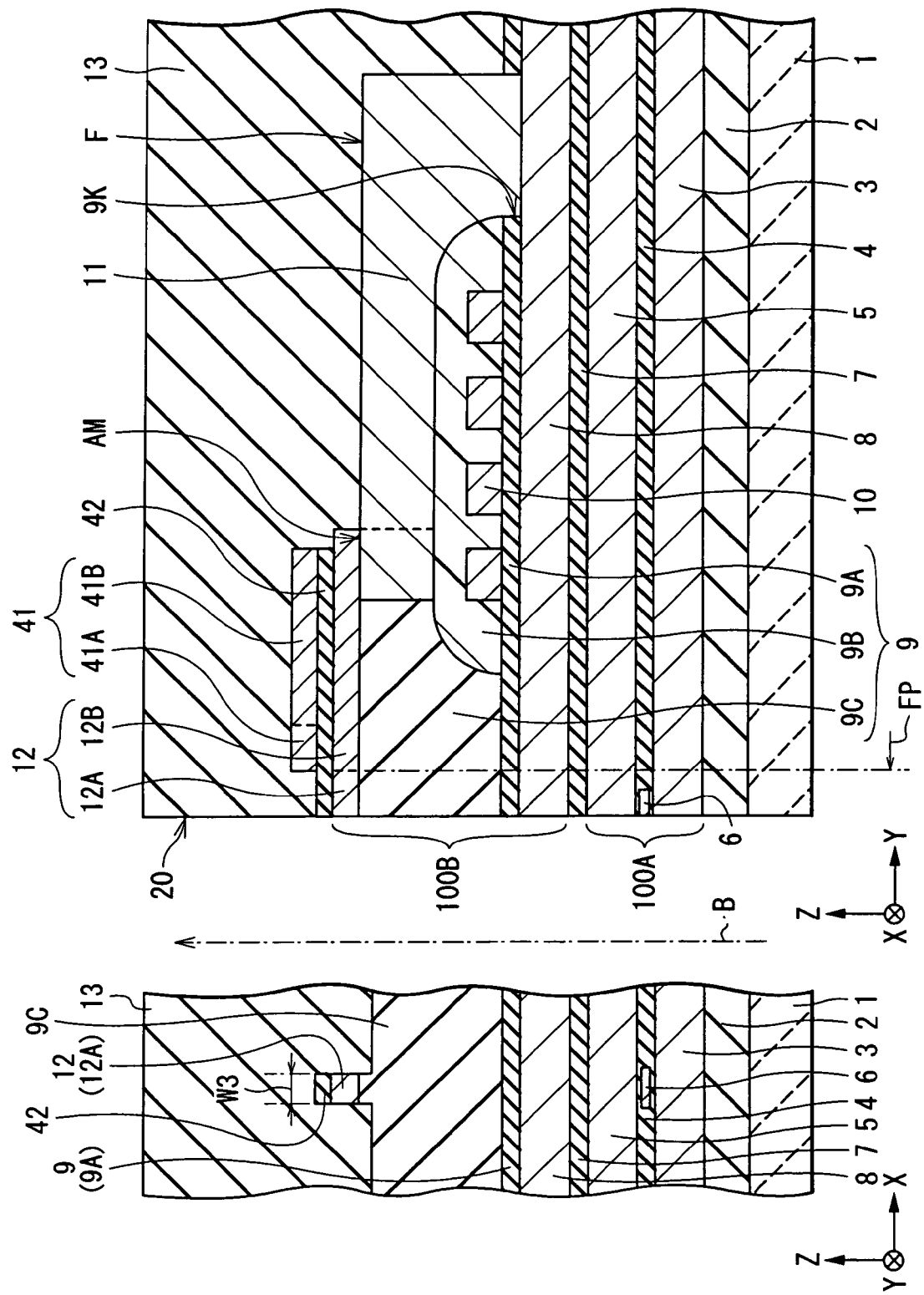
FIGS. 13A and 13B are sectional views of a sixth modification to the thin film magnetic head according to the first embodiment of the invention.
Figure 15:
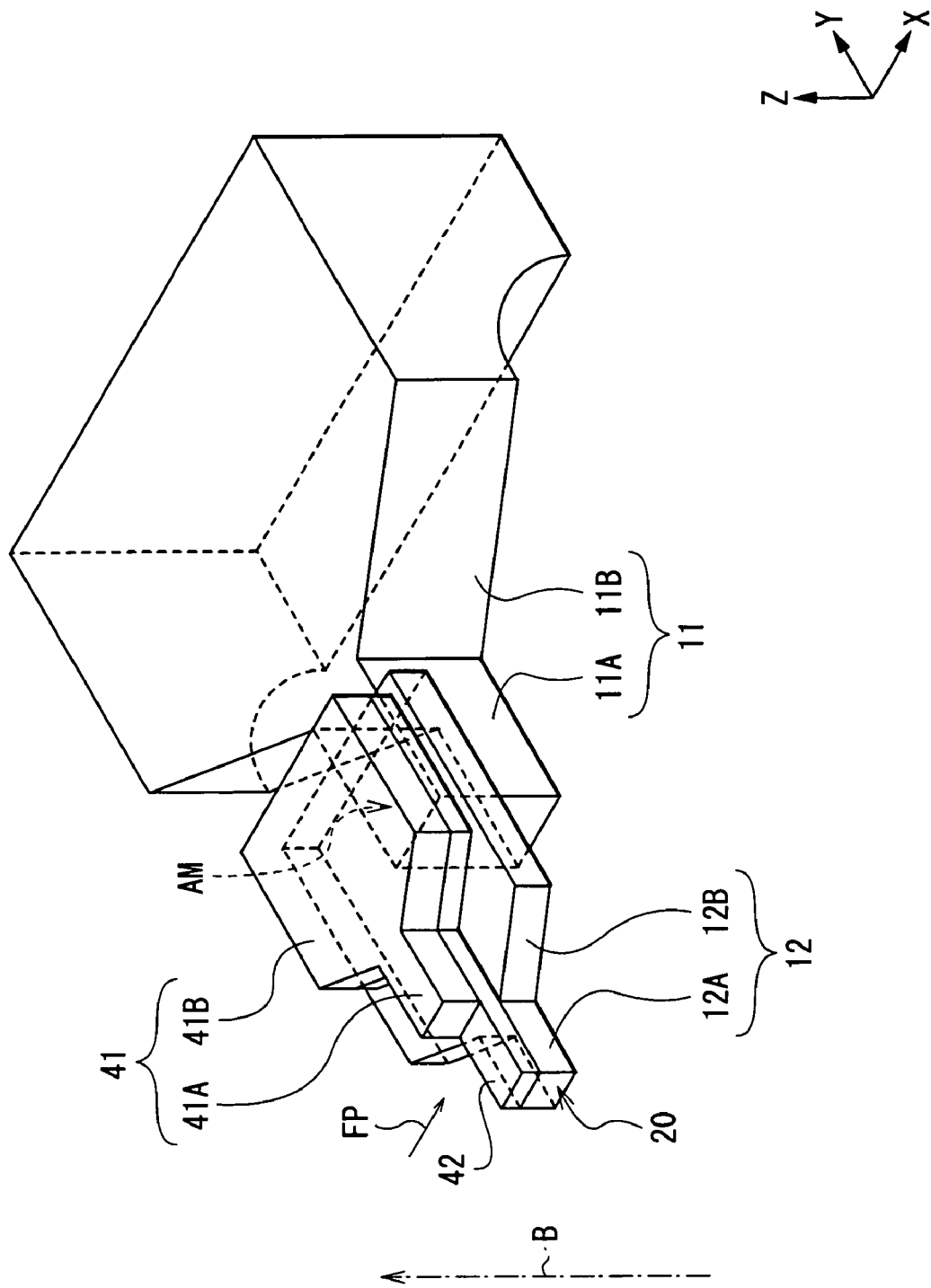
FIG. 15 is a perspective view of the main part of the thin film magnetic head shown in FIG. 14.

Further, in the case shown in FIG. 7, the pole layer 12 extends from the position P0 to the position P3 between the position P1 and the position P2, but it is not necessarily limited to this. For example, as shown in FIG. 12, when the width W4 of the rear end portion 12B in the pole layer 12 is smaller than the width W2 of the yoke layer 11 (W4<W2), the pole layer 12 may extend from the position P0 to the position P2.

Moreover, in the embodiment, for example, as shown n in FIGS. 13A through 15 corresponding to FIGS. 1A through 3, respectively, an auxiliary pole layer 41 may be disposed on the medium-outgoing side (an upper side in the drawings) of the pole layer 12 so as to be recessed from the air bearing surface 20 and extend from the flare point FP to the rear. The auxiliary pole layer 41 is laminated on the pole layer 12 with a non-magnetic layer 42 in between, and the auxiliary pole layer 41 is magnetically separated from the pole layer 11 by the non-magnetic layer 42, and includes a front end portion 41A having the same uniform width as that of the front end portion 12A of the pole layer 12, and a rear end portion 41B having a larger width than the width of the front end portion 41A in order from the flare point FP to the rear. The non-magnetic layer 42 is made of, for example, a non-magnetic material such as alumina or the like, and has the same plane shape as the pole layer 12. The front end portion 41A does not necessarily have the same width as the front end portion 12A, and may have a different width from the width of the front end portion 12A. In the thin film magnetic head, specifically the auxiliary pole layer 41 functions as an auxiliary flow path of the magnetic flux for supplying the magnetic flux to the front end portion 12A of the pole layer 12 in spite of the fact that the auxiliary pole layer 41 is magnetically separated from the pole layer 12, so the amount of the magnetic flux supplied to the front end portion 12A can be increased. The structure of the thin film magnetic head shown in FIGS. 13A through 15 is equivalent to that shown in FIGS. 1A through 3, except for the above characteristic structure.

The characteristics of the structure of the thin film magnetic head shown in FIGS. 1A through 3 and FIGS. 7 through 15 may be applied alone as described above, or in combination.

Second Embodiment

Next, a thin film magnetic head according to a second embodiment of the invention will be described below.

Figures 16A, 16B:
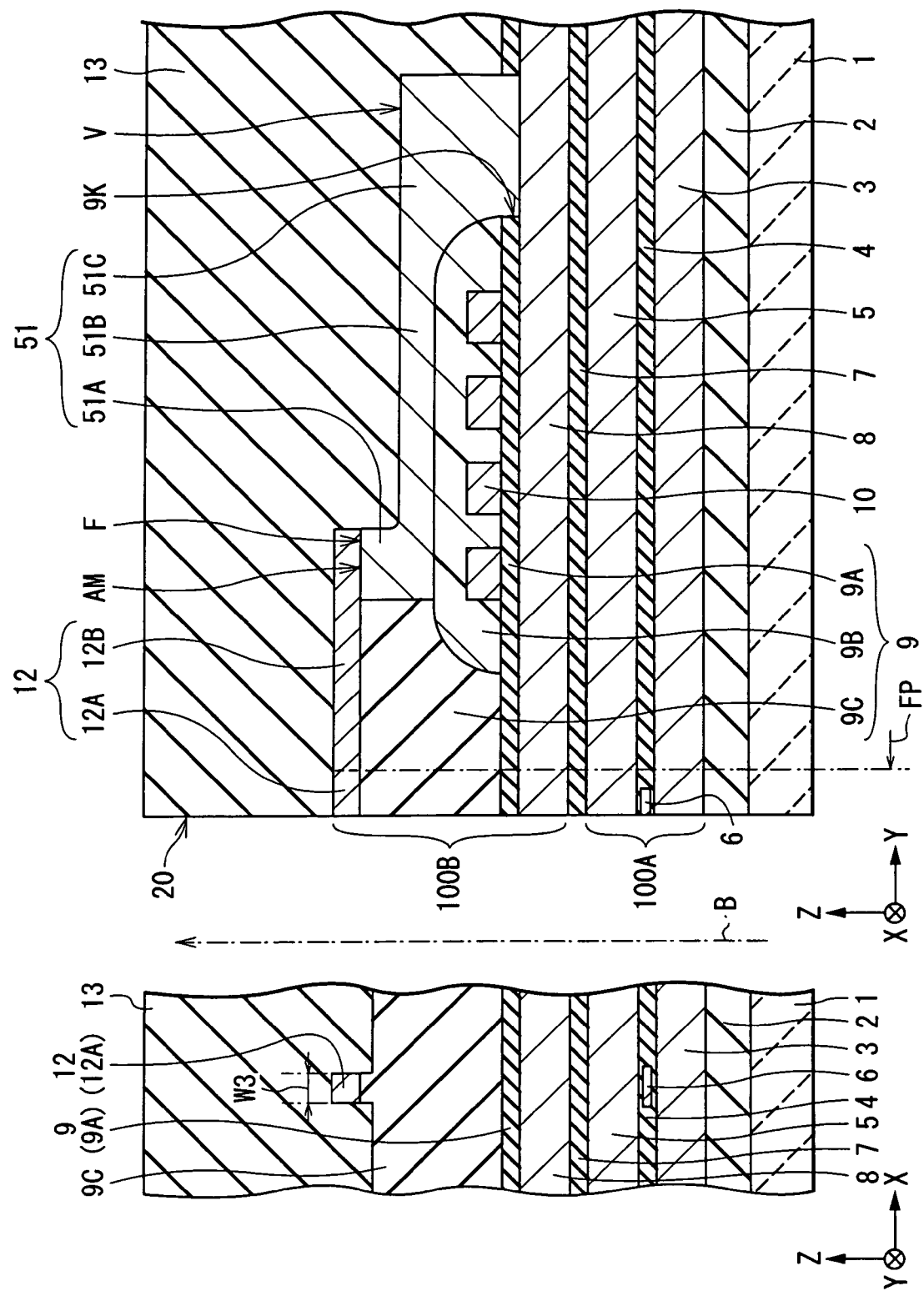
FIGS. 16A and 16B are sectional views of a thin film magnetic head according to a second embodiment of the invention.
Figure 17:
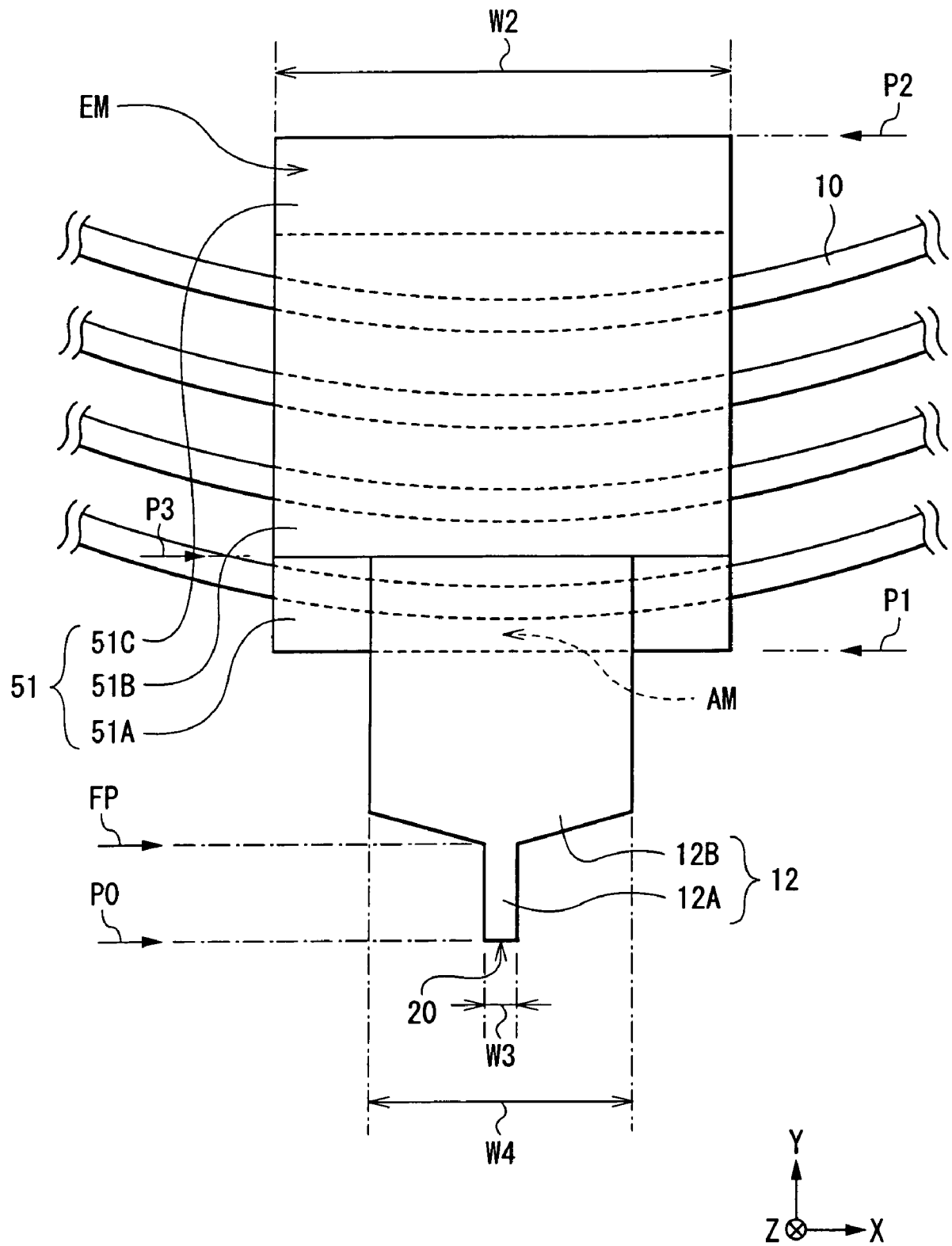
FIG. 17 is an enlarged plan view of a main part of the thin film magnetic head shown in FIGS. 16A and 16B.
Figure 18:
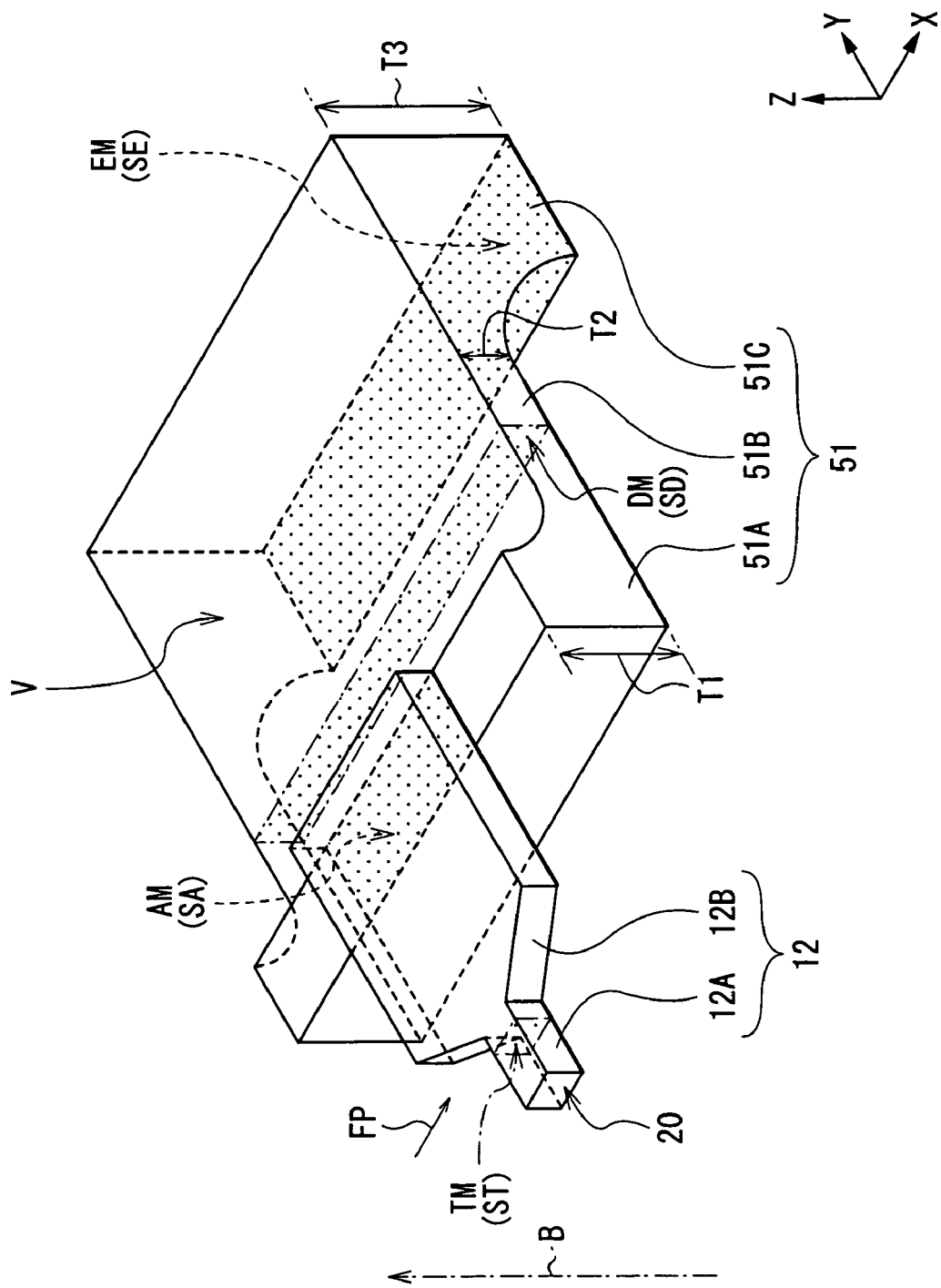
FIG. 18 is a perspective view of the main part of the thin film magnetic head shown in FIG. 17.

FIGS. 16A through 18 show the structure of the thin film magnetic head. FIGS. 16A and 16B show sectional views of the thin film magnetic head, and FIG. 17 shows an enlarged plan view of a main part (a yoke layer 51 and the pole layer 12) of the thin film magnetic head shown in FIGS. 16A and 16B, and FIG. 18 is a perspective view of the main part of the thin film magnetic head shown in FIG. 17.

In the thin film magnetic head, a recession V is disposed in a portion of the yoke layer 51 except for the connecting surface AM connected to the pole layer 12, for example, in a region at the rear of an end position (position P3) of the pole layer 12. More specifically, the yoke layer 51 includes a front end portion 51A being connected to the pole layer 12 in the connecting surface AM and having a thickness T1, a rear end portion 51C being connected to the return yoke layer 8, and having a thickness T3 and corresponding to the end portion 11E in the above first embodiment, and a middle portion 51B disposed between the front end portion 51A and the rear end portion 51C and having a smaller thickness T2 than the front end portion 51A and the rear end portion 51C (T2<T1, T3). The area SA of the connecting surface AM connecting between the yoke layer 51 and the pole layer 12 is smaller than the area of the plane shape of the yoke layer 51. Moreover, a relationship of SE>SD>ST is established among the area SE of the end surface EM (an end surface connected to the return yoke layer 8) of the rear end portion 51C in the yoke layer 51, the area SD of the sectional surface DM of the middle portion 51B in the yoke layer 51, and the area ST of the sectional surface TM of the front end portion 12A in the pole layer 12 (the sectional surfaces DM and TM are parallel to the air bearing surface 20). In FIG. 18, the connecting surface AM, the end surface EM, the sectional surface TM and the sectional surface DM are hatched.

Next, referring to FIGS. 16A through 20B, a method of manufacturing the thin film magnetic head shown in FIGS. 16A through 18 to which the method of manufacturing a thin film magnetic head according to the invention is applied will be described below. FIGS. 19A, 19B, 20A and 20B show sectional views for describing steps of forming the main part (the yoke layer 51 and the pole layer 12) of the thin film magnetic head. The method of manufacturing the thin film magnetic head has been already described above, so a method of forming the main part of the thin film magnetic head will be mainly described below.

Figure 19B:
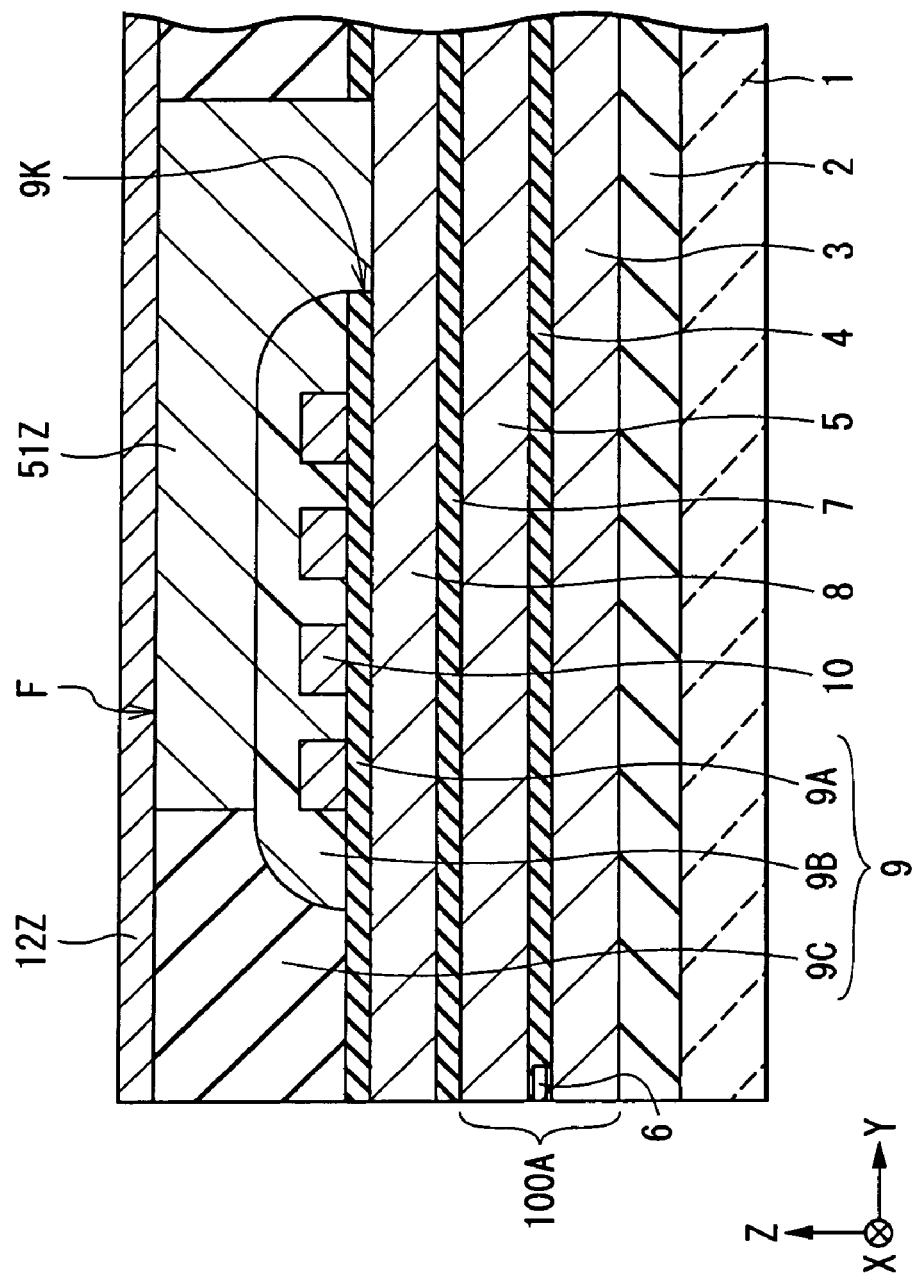
FIGS. 19A and 19B are sectional views for describing one step in a method of manufacturing the thin film magnetic head according to the second embodiment of the invention.
Figure 19A:
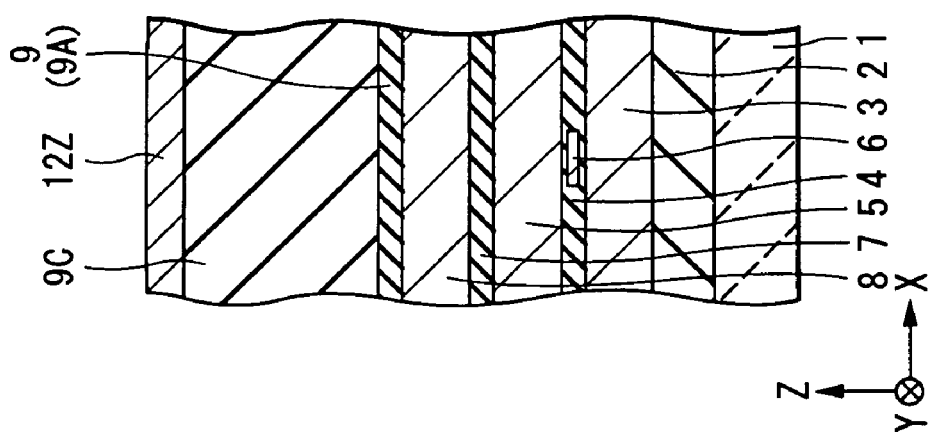

When the main part of the thin film magnetic head is formed, at first, as shown in FIGS. 19A and 19B, a precursor yoke layer pattern 51Z for forming the yoke layer 51 is formed so as to be flat, and the precursor yoke layer pattern 51Z and the gap layer portion 9C form the flat surface F.

Next, as shown in FIGS. 19A and 19B, a precursor pole layer 12Z for forming the pole layer 12 is formed on the flat surface F by using, for example, sputtering so that the precursor yoke layer pattern 51Z is covered with the precursor pole layer 12Z.

Figures 20A, 20B:
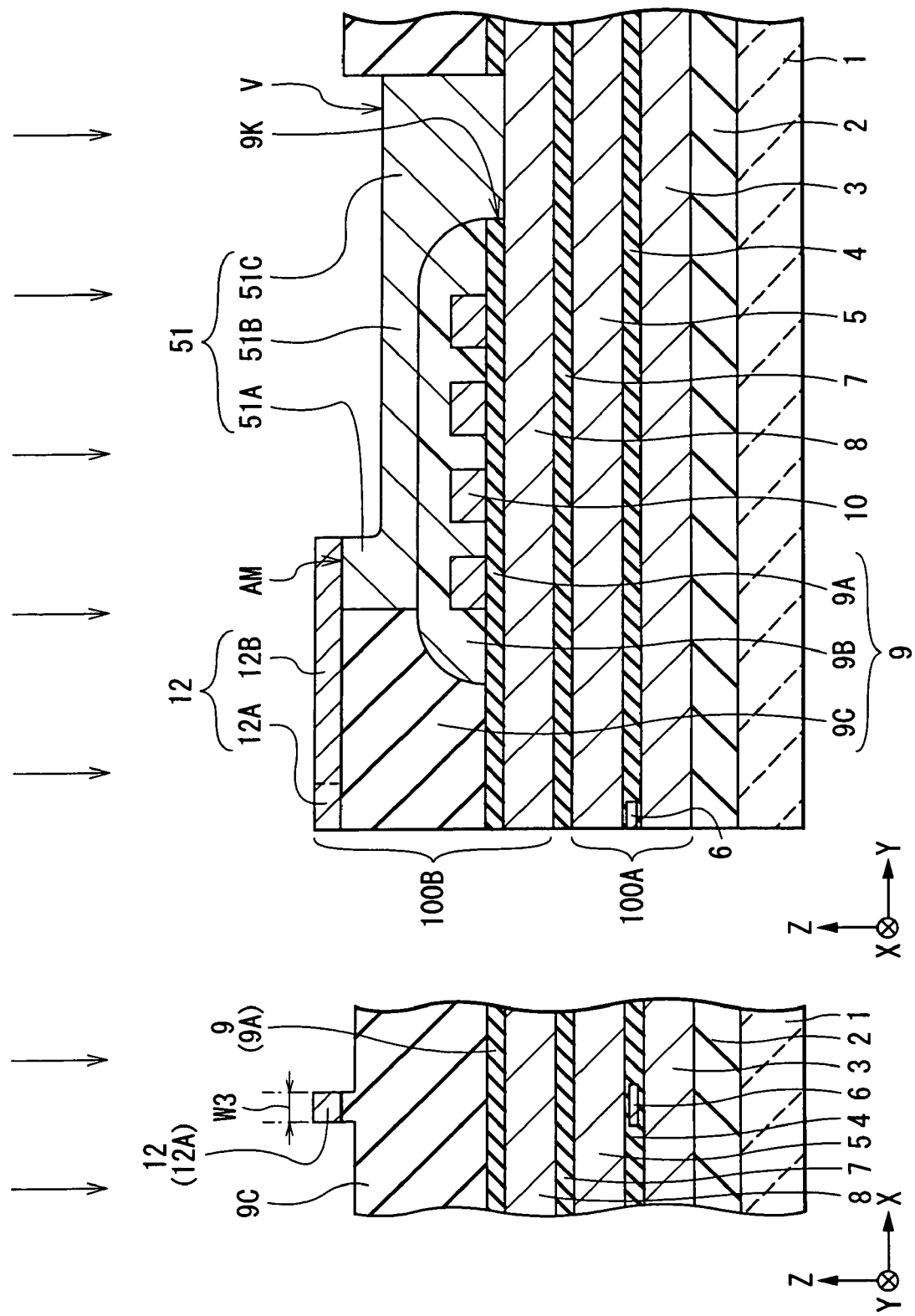
FIGS. 20A and 20B are sectional views for describing a step following the step of FIGS. 19A and 19B.

Finally, after a mask (not shown) having a pattern shape corresponding to the plane shape of the pole layer 12 is formed on the precursor pole layer 12Z, as shown in FIGS. 20A and 20B, the precursor pole layer 12Z is etched by using the mask through, for example, ion milling to be patterned, thereby the pole layer 12 is formed so as to include the front end portion 12A and the rear end portion 12B. When the pole layer 12 is formed, after patterning the precursor pole layer 12Z, the whole surface is continuously etched. A portion of the precursor yoke layer pattern 51Z except for a portion (the connecting surface AM) which is finally connected to the pole layer 12, for example, a region at the rear of the end position (the position P3) of the pole layer 12 is continuously etched to be recessed. Thereby, the recession V is formed in the precursor yoke layer pattern 51Z. By the etching process, the yoke layer 51 is formed so as to include the front end portion 51A connected to the pole layer 12 in the connecting surface AM, the rear end portion 51C connected to the return yoke layer 8, and the middle portion 51B having a smaller thickness than the front end portion 51A and the rear end portion 51C.

In the thin film magnetic head according to the embodiment, a portion of the yoke layer 51 and a portion of the pole layer 12 are connected to each other, so by the same effect as that in the first embodiment, the flow of the magnetic flux from the yoke layer 51 to the pole layer 12 can be appropriately controlled so as to prevent information from being overwritten without intention during recording.

More specifically, in the embodiment, the yoke layer 51 is formed so as to include the rear end portion 51C having the thickness T3 and the middle portion 51B having the thickness T2 smaller than the thickness T3 of the rear end portion 51C, so when the magnetic flux flowing through the yoke layer 51 flows from the rear end portion 51C to the middle portion 51B, the magnetic flux is concentrated in a thickness direction according to a decrease in the thickness of the yoke layer 51. Therefore, by the same effect as that in the first embodiment in which the magnetic flux is concentrated in the width direction according to a decrease in the width of the yoke layer 11 (refer to FIGS. 8 and 9), the flow of the magnetic flux from the yoke layer 51 to the pole layer 12 can be more effectively controlled.

Moreover, in the method of manufacturing the thin film magnetic head according to the embodiment, the precursor yoke layer pattern 51Z is continuously etched by using the etching process for forming the pole layer 12 so as to be recessed, thereby the recession V is formed in the precursor yoke layer pattern 51Z so as to form the yoke layer 51 including the middle portion 51B and the rear end portion 51C having different thicknesses from each other. Therefore, compared to the case where the etching process for forming the pole layer 12 and the etching process for forming the recession V are separately carried out, time and effort required for a preparation for the etching process or the like can be saved. Accordingly, the yoke layer 51 can be more easily formed, so the thin film magnetic head can be more easily manufactured.

In the embodiment, as long as a portion of the yoke layer 51 and a portion of the pole layer 12 are connected to each other, and specifically at least a part of a portion of the yoke layer 51 except for the connecting surface AM connected to the pole layer 12 is recessed, thereby the flow of the magnetic flux from the yoke layer 51 to the pole layer 12 can be appropriately controlled, and information can be prevented from being overwritten without intention during recording, the structure of the thin film magnetic head can be freely modified.

Figures 21A, 21B:
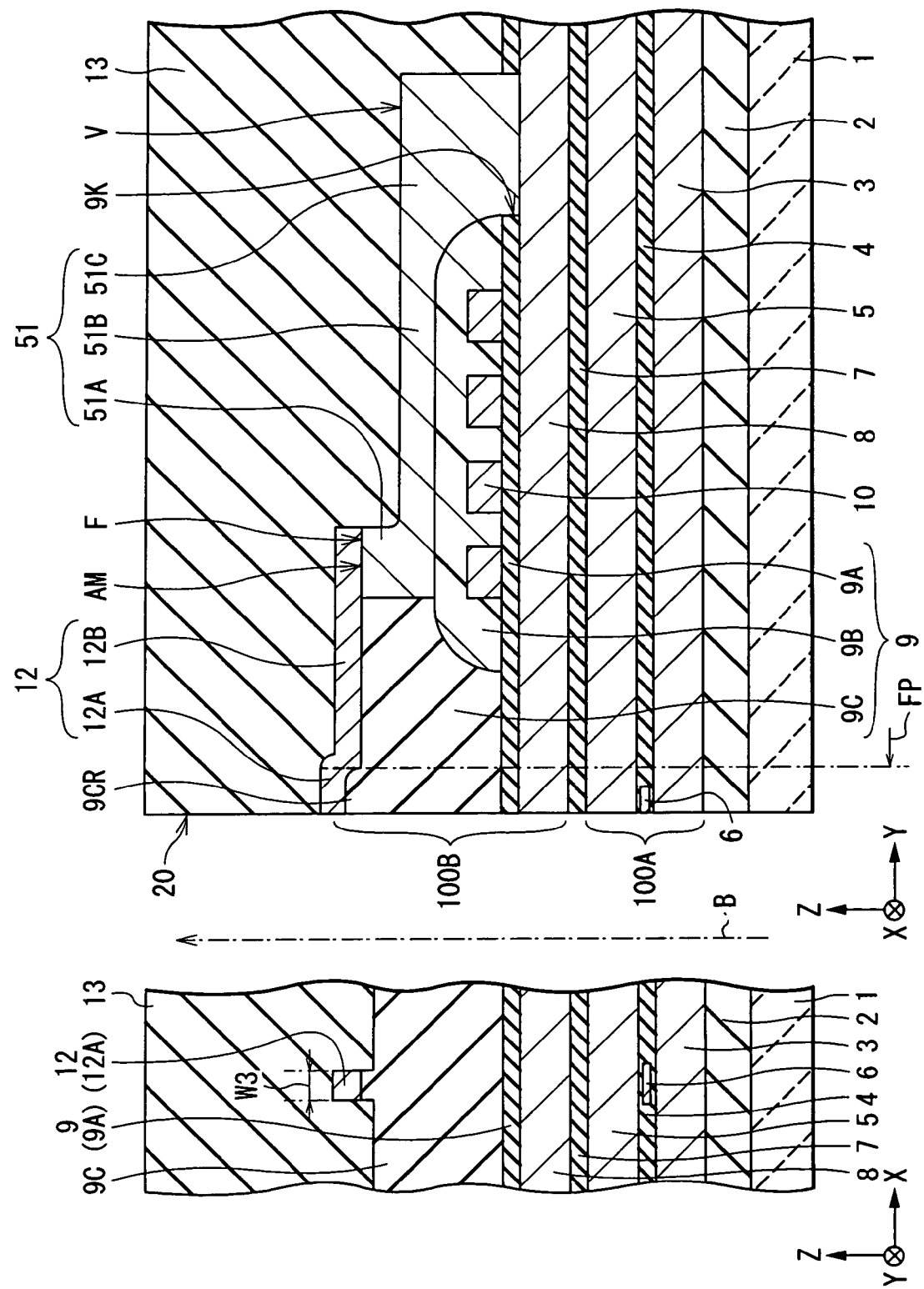
FIGS. 21A and 21B are sectional views of a first modification to the thin film magnetic head according to the second embodiment of the invention.

More specifically, in the embodiment, as shown in FIGS. 16A and 16B, the whole pole layer 12 is disposed on the flat surface F, but it is not necessarily limited to this. For example, as shown in FIGS. 21A and 21B, a projection 9CR having a rounded oblique surface may be disposed in the gap layer portion 9C so as to be exposed to the air bearing surface 20, and the front end portion 12A of the pole layer 12 may be laid on the projection 9CR. In the thin film magnetic head comprising the pole layer 12 with the structure, the flow path of the magnetic flux from the rear end portion 12B to the front end portion 12A is bended in a crank shape to the medium-outgoing side (an upper side in the drawings), so the magnetic flux flowing through the pole layer 12 is concentrated on a portion of the front end portion 12A on the medium-outgoing side which is a main recording part during recording. Therefore, the perpendicular magnetic field strength can be more increased. The structure of the thin film magnetic head shown in FIGS. 21A and 21B is equivalent to that shown in FIGS. 16A and 16B except for the above characteristic parts.

Figures 22A, 22B:
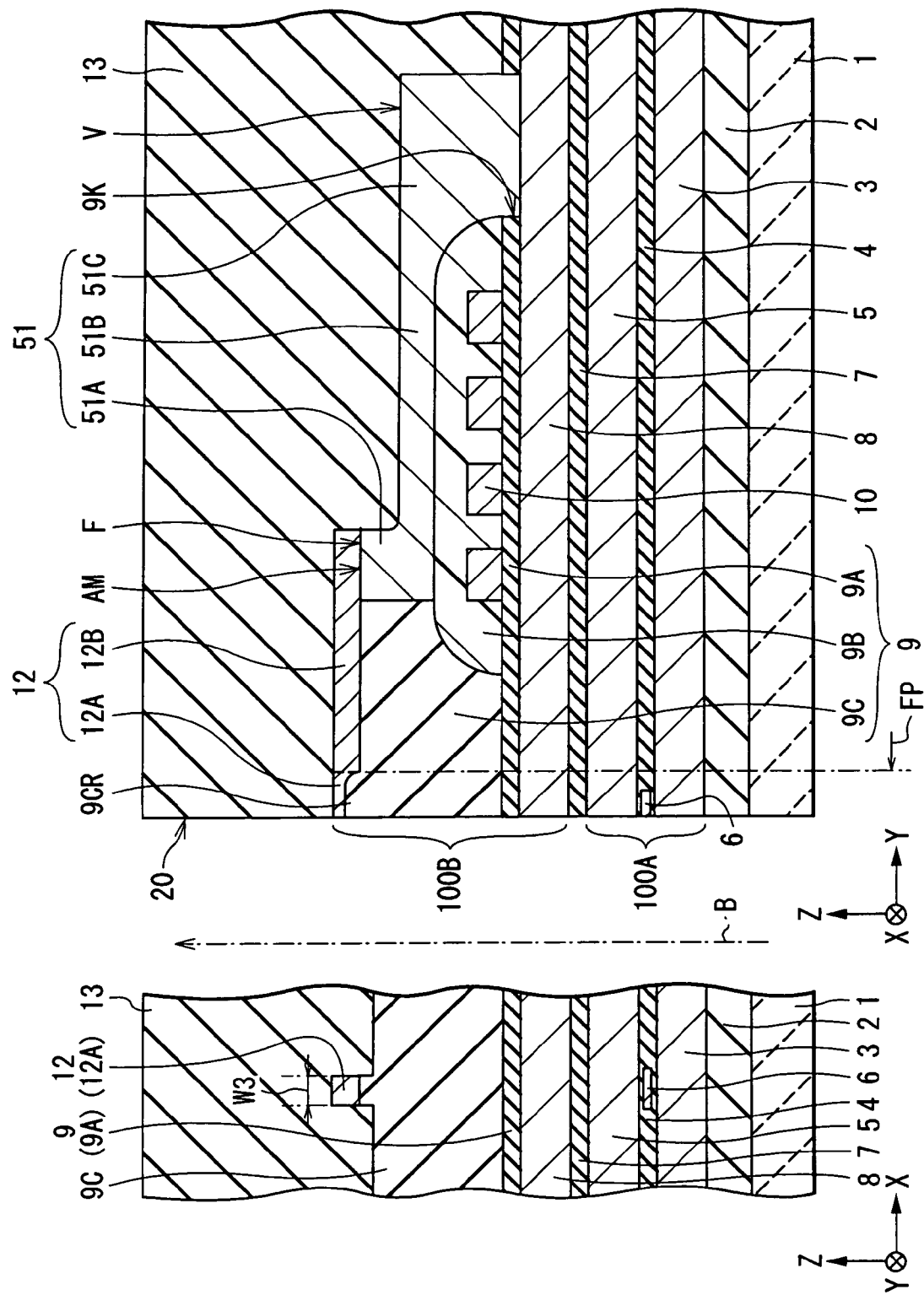
FIGS. 22A and 22B are sectional views of a second modification to the thin film magnetic head according to the second embodiment of the invention.

Moreover, in the case shown in FIGS. 21A and 21B, the front end portion 12A is laid on the projection 9CR of the gap layer portion 9C, thereby the front end portion 12A is placed in a higher position than the rear end portion 12B, but it is not necessarily limited to this. For example, as shown in FIGS. 22A and 22B, while the front end portion 12A is laid on the projection 9CR of the gap layer portion 9C, the pole layer 12 may become flat. In the thin film magnetic head comprising the pole layer 12 with the structure, when the magnetic flux flows from the rear end portion 12B to the front end portion 12A in the pole layer 12, the flow path of the magnetic flux is narrowed on the medium-outgoing side, so the magnetic flux is concentrated on the medium-outgoing side of the front end portion 12A, thereby the perpendicular magnetic field strength can be more increased. The structure of the thin film magnetic head shown in FIGS. 22A and 22B is equivalent to that shown in FIGS. 21A and 21B except for the above characteristic parts.

Moreover, in the case shown in FIGS. 22A and 22B, the magnetic flux is concentrated on a portion of the front end portion 12A on the medium-outgoing side in the pole layer 12 with a single-layer structure, but it is not necessarily limited to this. For example, a shown in FIGS. 23A and 23B, the magnetic flux may be concentrated in a pole layer 60 with a laminate structure in a like manner. The pole layer 60 includes a bottom pole layer 61 as a first layer disposed so as to be adjacent to the flat surface F of the gap layer portion 9C and the projection 9CR having a flat oblique surface and so as to be recessed from the air bearing surface 20, and a top pole layer 62 as a second layer disposed on the medium-outgoing side of the bottom pole layer 61 so as to be exposed to the air bearing surface which are laminated in order. The top pole layer 62 has substantially the same structure as the pole layer 12 according to the embodiment, and includes a front end portion 62A and a rear end portion 62B in order from a side closer to the air bearing surface 20. The position of a front end of the bottom pole layer 61 agrees with a connecting position between the front end portion 62A and the rear end portion 62B in the top pole layer 62, that is, the flare point FP. In the thin film magnetic head comprising the pole layer 60 with a laminate structure, when the magnetic flux flows from the bottom pole layer 61 to the top pole layer 62 in the pole layer 60, the magnetic flux path is narrowed on the medium-outgoing side, so the magnetic flux is concentrated on a portion of the front end portion 62A on the medium-outgoing side in the top pole layer 62. Therefore, the perpendicular magnetic field strength can be more increased.

Figures 23A, 23B:
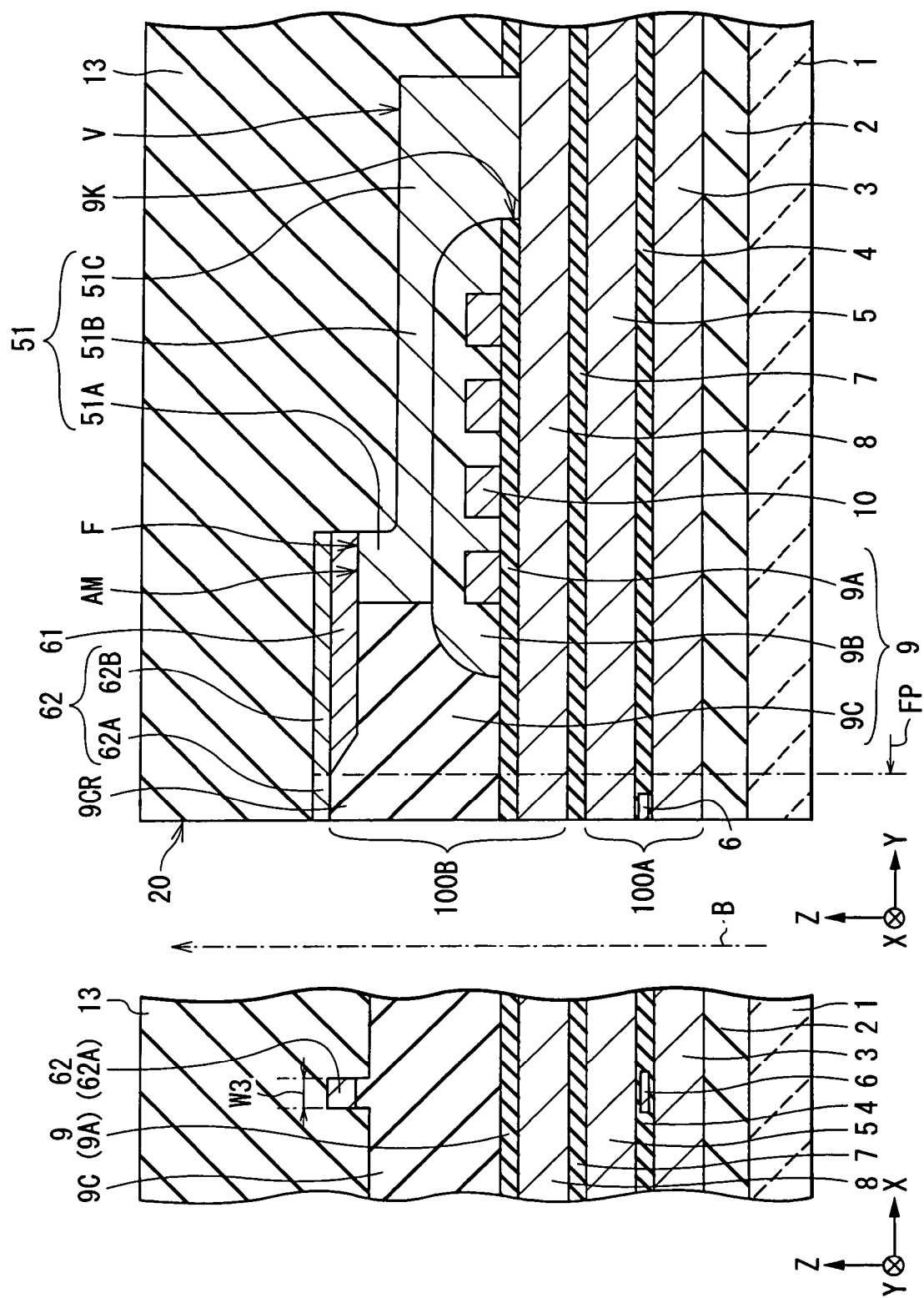
FIGS. 23A and 23B are sectional views of a third modification to the thin film magnetic head according to the second embodiment of the invention.
Figures 24A, 24B:
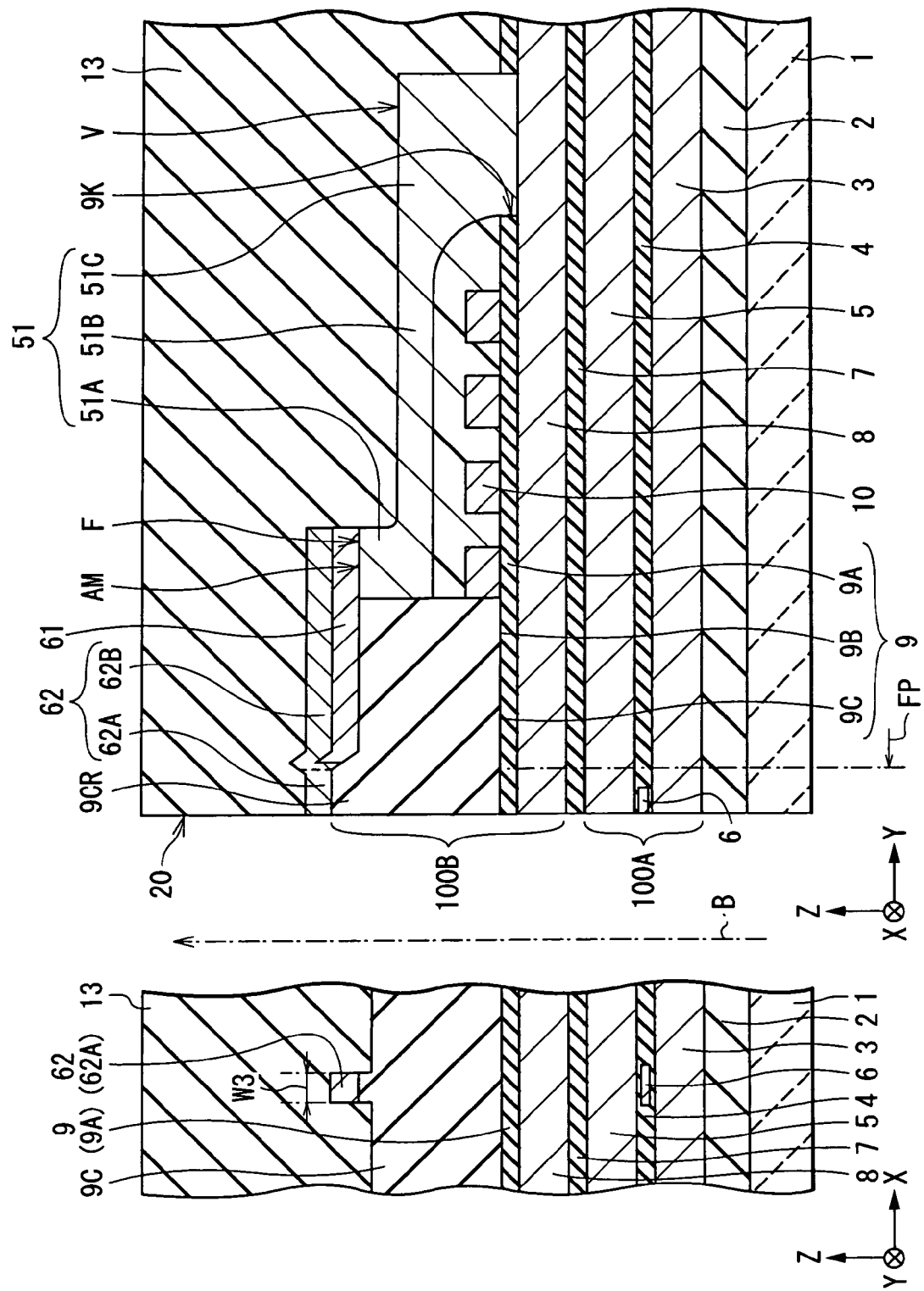
FIGS. 24A and 24B are sectional views of a fourth modification to the thin film magnetic head according to the second embodiment of the invention.

Further, in the case shown in FIGS. 23A and 23B, the bottom pole layer 61 and the top pole layer 62 become flat, but it is not necessarily limited to this. For example, as shown in FIGS. 24A and 24B, a portion of the bottom pole layer 61 in proximity to a front end of the bottom pole layer 61 may be substantially vertically projected, and a corresponding portion of the top pole layer 62 may be projected in a like manner by reflecting the structural characteristics of the bottom pole layer 61. In this case, specifically the front end position of the bottom pole layer 61 can be controlled with high precision, because, as shown in FIGS. 23A and 23B, in the case where the bottom pole layer 61 and the projection 9CR of the gap layer portion 9C form a flat surface, when the bottom pole layer 61 is polished to become flat, the front end position of the bottom pole layer 61 is greatly changed depending upon a polishing amount, however, as shown in FIGS. 24A and 24B, in the case where the portion of the bottom pole layer 61 in proximity to the front end is substantially vertically projected, as long as polishing is carried out in a range of the thickness of the projection, the front end position of the bottom pole layer 61 is not greatly changed. The structures of the thin film magnetic head shown in FIGS. 23A, 23B, 24A and 24B are equivalent to that shown in FIGS. 22A and 22B except for the above characteristic parts.

Figures 25A, 25B:
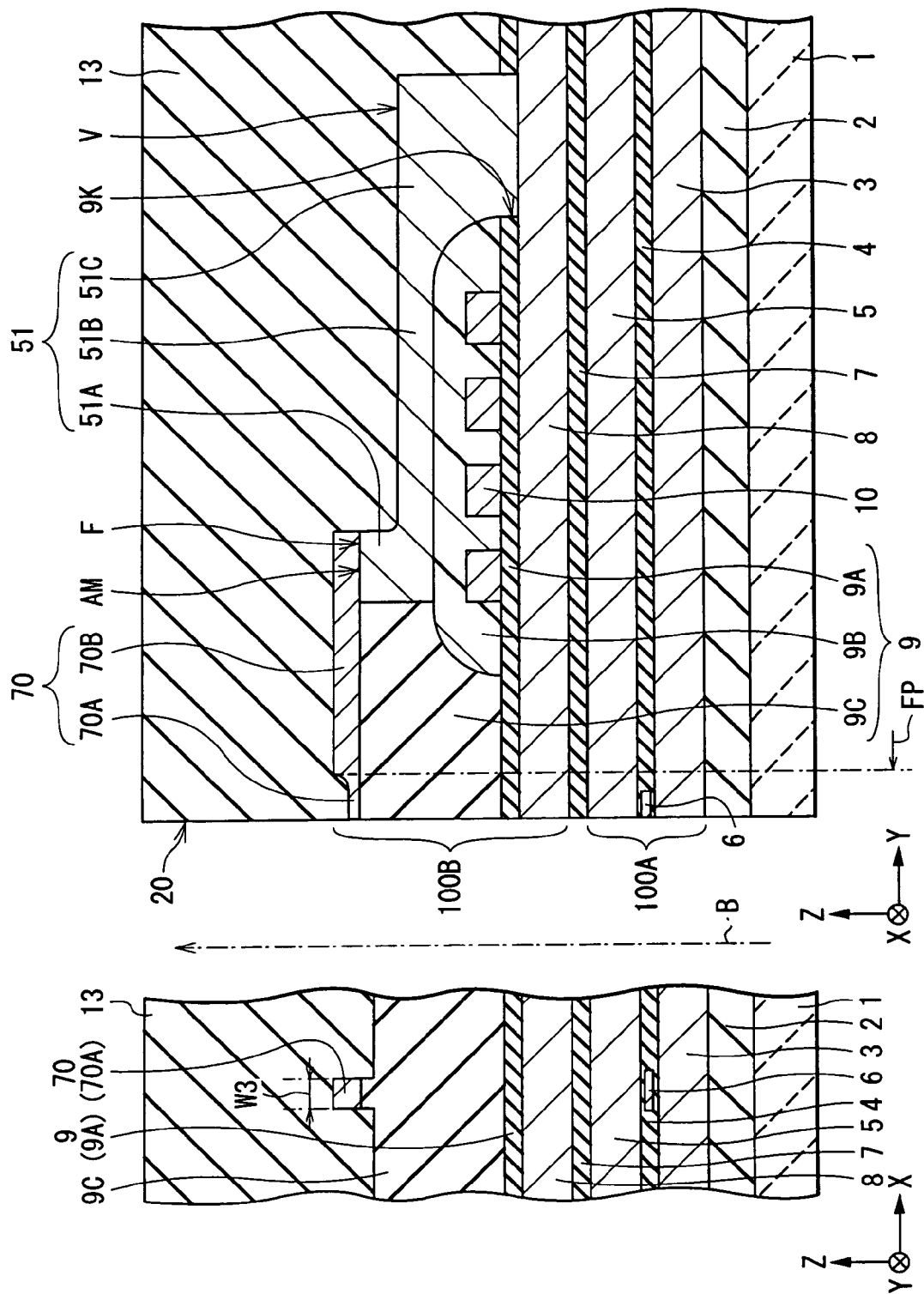
FIGS. 25A and 25B are sectional views of a fifth modification to the thin film magnetic head according to the second embodiment of the invention.

In the cases shown in FIGS. 21A through 24B, in order to concentrate the magnetic flux on a portion of the front end portion 12A or 62A on the medium-outgoing side, the pole layer 12 or 60 formed so that the flow path of the magnetic flux is narrowed on the medium-outgoing side is included, but it is not necessarily limited to this. For example, as shown in FIGS. 25A and 25B, the thin film magnetic head may comprise a pole layer 70 including a front end portion 70A and a rear end portion 70B having a larger thickness than the front end portion 70A in order from a side closer to the air bearing surface 20, and being formed so that the flow path of the magnetic flux is narrowed on the medium-incoming side (a lower side in the drawings). In the thin film magnetic head comprising the pole layer 70, the magnetic flux flowing through a portion of the rear end portion 70B on the medium-outgoing side is concentrated on the medium-incoming side, and then flows to the front end portion 70A, thereby the magnetic flux can be concentrated on a portion of the front end portion 70A on the medium-outgoing side. Therefore, as in the case shown in FIGS. 21A through 24B in which the flow path of the magnetic flux is narrowed on the medium-outgoing side, the perpendicular magnetic field strength can be more increased. The structure of the thin film magnetic head shown in FIGS. 25A and 25B is equivalent to that shown in FIGS. 21A through 24B except for the above characteristic parts.

Figure 26:
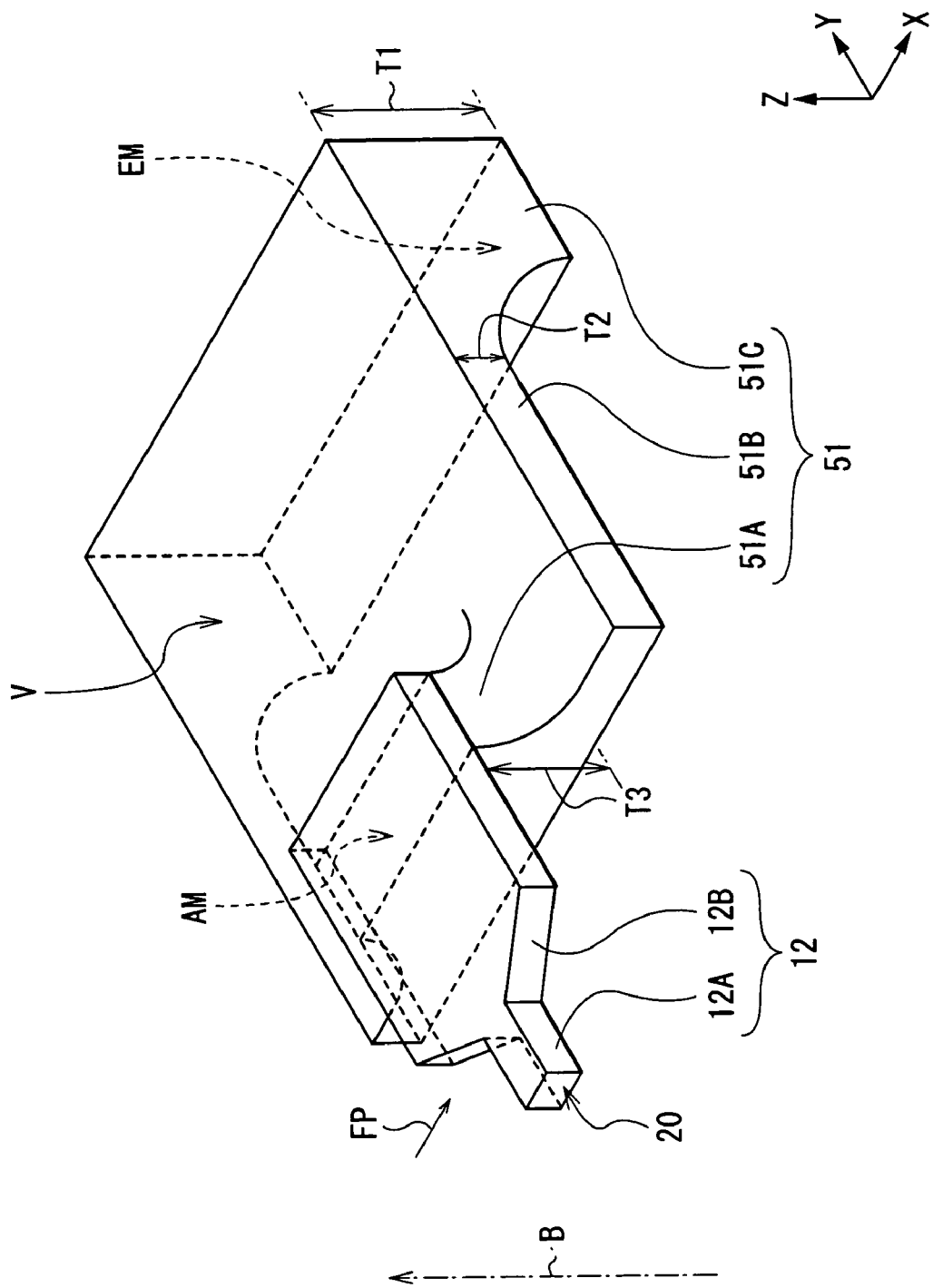
FIG. 26 is a perspective view of a sixth modification to the main part of the thin film magnetic head according to the second embodiment of the invention.

In the embodiment, when the yoke layer 51 is formed through etching the precursor yoke layer pattern 51Z so as to recess the precursor yoke layer pattern 51Z, a region of the precursor yoke layer pattern 51Z at the rear of the end position (the position P3) of the pole layer 12 is recessed, but it is not necessarily limited to this. As long as the yoke layer 51 can be formed so as to include the rear end portion 51C and the middle portion 51B having a smaller thickness than the rear end portion 51C, a range of the precursor yoke layer pattern 51Z to be recessed can be freely changed. More specifically, for example, the whole precursor yoke layer pattern 51Z except for the connecting surface AM connected to the pole layer 12 may be recessed. FIG. 26 shows a perspective view of the yoke layer 51 and the pole layer 21 formed in this case.

The structure, actions, functions, effects and modifications of the thin film magnetic head according to the embodiment are equivalent to those according to the first embodiment, and will not be further described.

Figure 27:
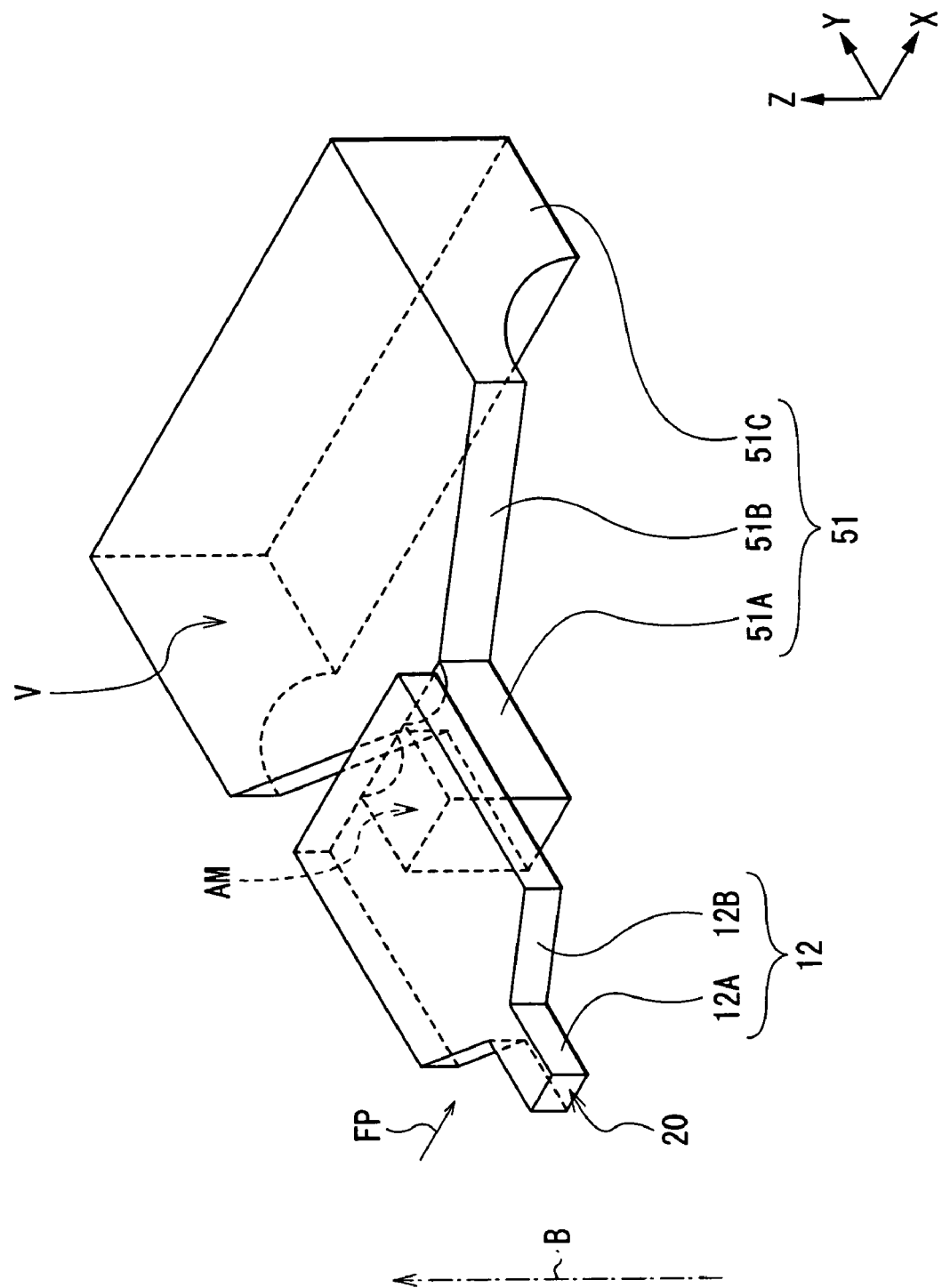
FIG. 27 is a perspective view of a seventh modification to the main part of the thin film magnetic head according to the second modification to the invention.

The characteristics of the structure of the thin film magnetic head shown in FIGS. 16A through 18, and FIGS. 21A through 26 may be applied alone as described above or in combination. A combination of one or more of the characteristics of the thin film magnetic head according to the first embodiment and one or more of the characteristics of the thin film magnetic head according to the second embodiment may be applied. As an example of the combination of the characteristics of the thin film magnetic head according to the first embodiment and the characteristics of the thin film magnetic head according to the second embodiment, for example, as shown in FIG. 27, in the thin film magnetic head shown in FIG. 18, the yoke layer 51 may have a substantially T-shaped flat surface. In this case, the front end portion 51A of the yoke layer 51 corresponds to the front end portion 11A of the yoke layer 11 according to the first embodiment (refer to FIG. 3), and a combination of the middle portion 51B and the rear end portion 51C corresponds to the rear end portion 11B. The structure of the thin film magnetic head shown in FIG. 27 is equivalent to that shown in FIG. 18 except for the above characteristic parts.

Although the invention is described referring to the embodiments, the invention is not limited to the embodiments, and can be variously modified. More specifically, in the above embodiments, the invention is applied to a composite thin film magnetic head comprising the reproducing head portion 100A and the recording head portion 100B, but the invention is not limited to this, and can be applied to a thin film magnetic head for recording only comprising only the recording head portion 100B, a thin film magnetic head comprising a reproducing/recording head capable of reproducing and recording. Moreover, the invention can be applied to a thin film magnetic head with a structure in which the reproducing head portion 100A and the recording head portion 100B are laminated in reverse order.

EXAMPLE

Next, an example of the invention will be described below. When various characteristics of the thin film magnetic head shown in FIGS. 8 and 9 according to the first embodiment (hereinafter simply referred to as "the thin film magnetic head of the invention") were examined, the following characteristics were confirmed.

Figure 28:
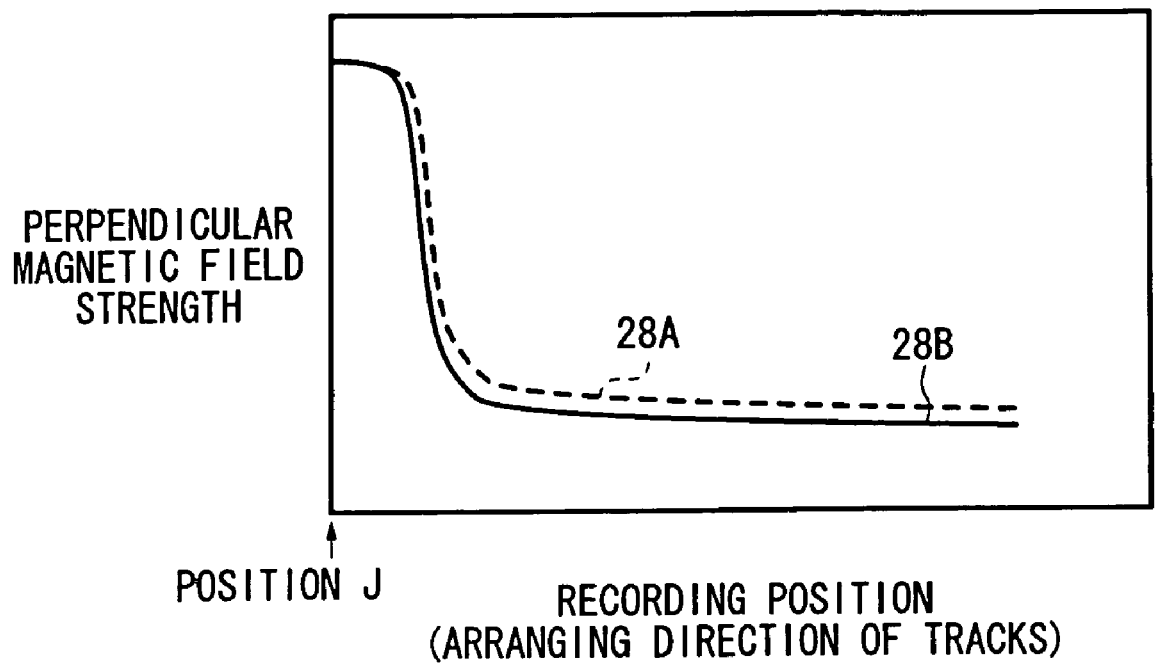
FIG. 28 is a plot showing dependence of perpendicular magnetic field strength on recording position in an arranging direction of a plurality of tracks.
Figure 29:
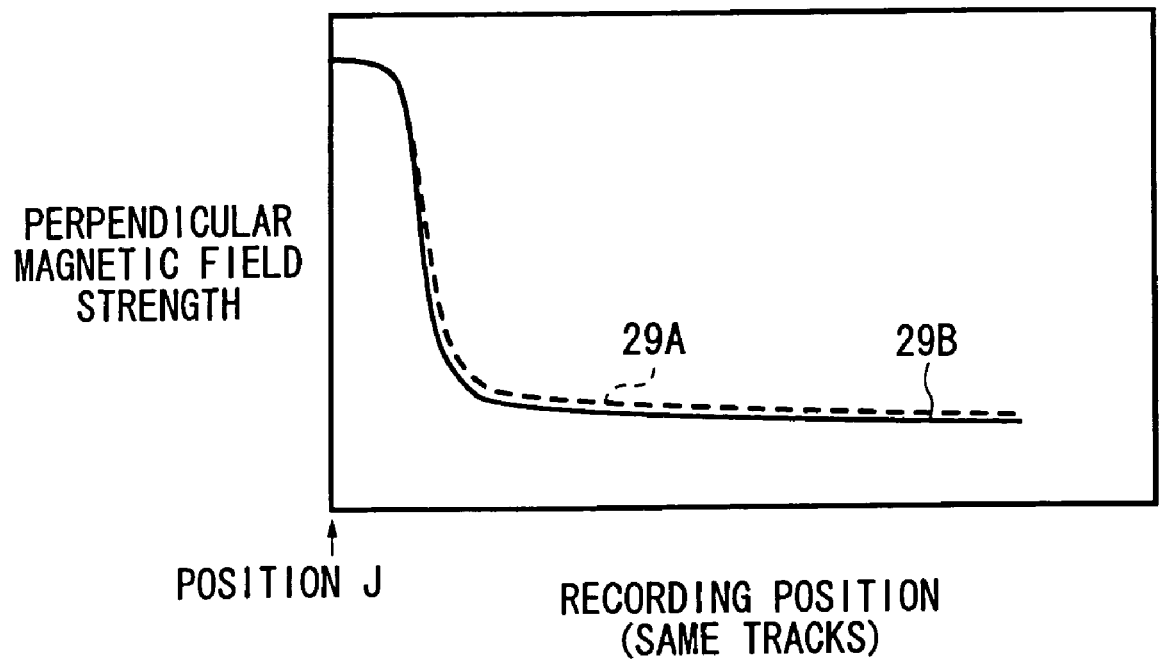
FIG. 29 is a plot showing dependence of perpendicular magnetic field strength on recording position in the same track.

At first, when dependence of the perpendicular magnetic field strength on recording position was examined, the results shown in FIGS. 28 and 29 were obtained. In FIG. 28, the horizontal axis indicates a recording position in an arranging direction of a plurality of tracks (a direction of the radius of the recording medium), and the vertical axis indicates the perpendicular magnetic field strength ($10^3/(4\pi)$A/m(=Oe)), and a curve 28A indicates a thin film magnetic head as a comparative example (refer to FIGS. 4 through 6), and a curve 28B indicates the thin film magnetic head of the invention. In FIG. 29, the horizontal axis indicates a recording position in the same track disposed on the recording medium, and the vertical axis indicates the perpendicular magnetic field strength ($10^3/(4\pi)$A/m), a curve 29A indicates the thin film magnetic head as the comparative example, and a curve 29B indicates the thin film magnetic head of the invention. A position J indicated in the horizontal axis in FIGS. 28 and 29 indicates a track position targeted for recording.

It was obvious from the results shown in FIG. 28 that the perpendicular magnetic field strength gradually decreased with distance from the track position targeted for recording (position J) in the arranging direction of the plurality of tracks disposed on the recording medium. Specifically, the perpendicular magnetic field strength in a position away from the track position targeted for recording became smaller in the thin film magnetic head of the invention (the curve 28B) than that of the comparative example (the curve 28A). Moreover, it was obvious from the results shown in FIG. 29 that the perpendicular magnetic field strength gradually decreased with distance from the track position targeted for recording on the same track disposed on the recording medium. Specifically, the perpendicular magnetic field strength in a position away from the track position targeted for recording became smaller in the thin film magnetic head of the invention (the curve 29B) than that of the comparative example (the curve 29A). Accordingly, it was confirmed that in the case where recording was carried out by using the thin film magnetic head of the invention, unnecessary perpendicular magnetic field strength around the track targeted for recording, that is, the magnetic field strength which could have an adverse effect as a leakage magnetic field became smaller, compared to the case where recording was carried out by using the thin film magnetic head of the comparative example, so the possibility of overwriting information without intention during recording around the track targeted for recording was reduced.

Figure 30:
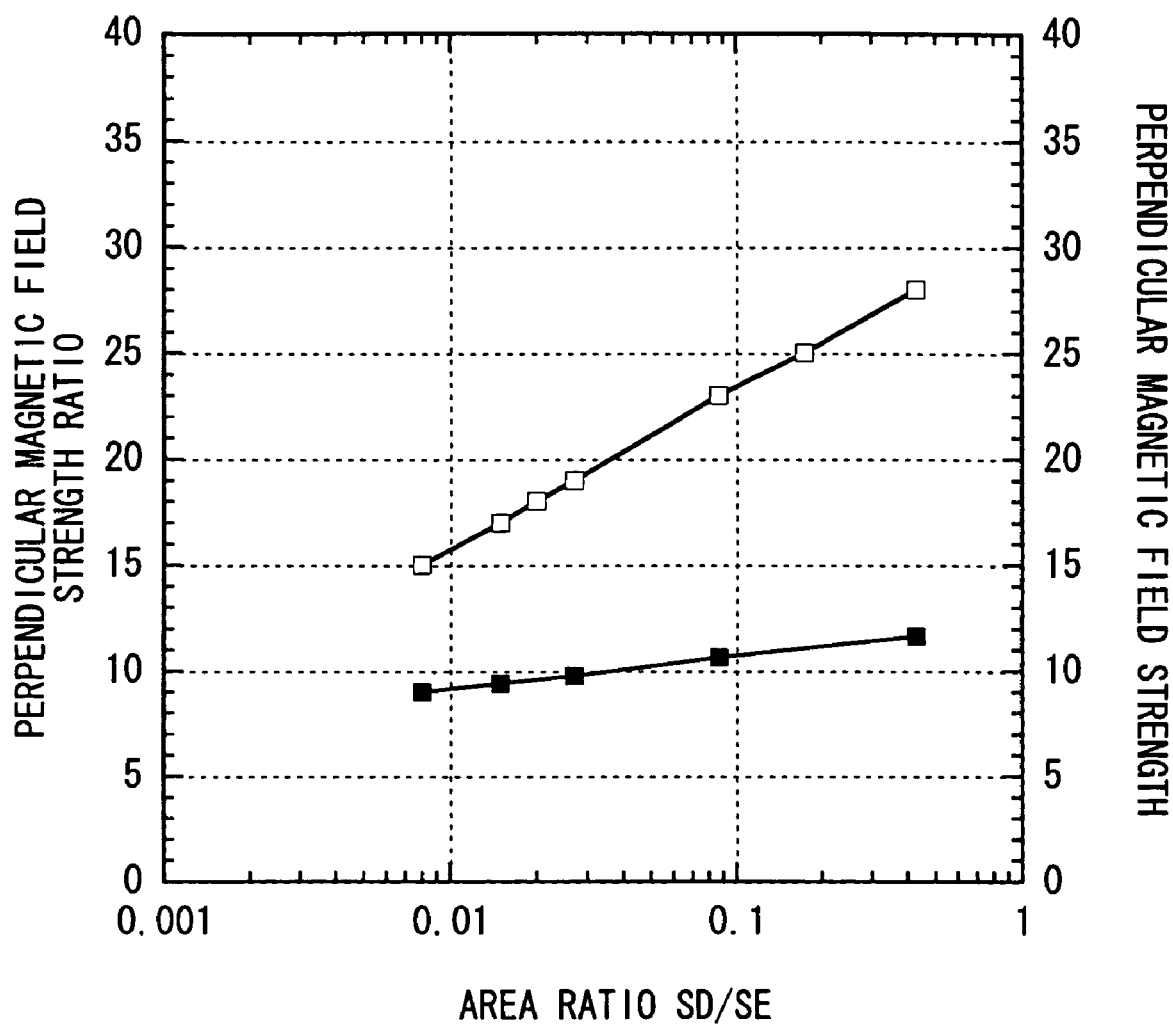
FIG. 30 is a plot showing dependence of perpendicular magnetic field strength on area ratio.

Next, when dependence of the perpendicular magnetic field strength on an area ratio SD/SE was examined, the results shown in FIG. 30 were obtained. In FIG. 30, the horizontal axis indicates the area ratio SD/SE (in logarithm), the right vertical axis indicates the perpendicular magnetic field strength ($10^3 \times 10^3/(4\pi)$A/m(=kOe)), the left vertical axis indicates a strength ratio between the perpendicular magnetic field strength in the track targeted for recording and the perpendicular magnetic field strength in an adjacent track adjacent to the track targeted for recording, and a symbol "○" indicates the perpendicular magnetic field strength, and a symbol "□" indicates a perpendicular magnetic field strength ratio.

It was obvious from the results shown in FIG. 30 that the perpendicular magnetic field strength (refer to the symbol "○") gradually increased with an increase in the area ratio SD/SE, that is, with an increase in the area SD of the sectional surface DM of the front end portion 11A relative to the area SE of the end surface EM of the yoke layer 11. Moreover, the perpendicular magnetic field ratio (refer to the symbol "□") gradually increased with an increase in the area ratio SD/SE in a like manner. The results indicated that the perpendicular magnetic field strength in the adjacent track became smaller than the perpendicular magnetic field strength in the track targeted for recording, thereby as a result, a difference between the perpendicular magnetic field strength in the track targeted for recording and the perpendicular magnetic field in the adjacent track became larger. Accordingly, it was confirmed that when the area ratio SD/SE was within a range of $0.008 \leq SD/SE \leq 0.3$, the perpendicular magnetic field strength could be secured in the track targeted for recording to the extent that stable recording could be secured, and the leakage magnetic field strength could be reduced in the adjacent track to the extent that information could be prevented from being overwritten without intention.

When the area ratio SD/SE is out of the above range, a malfunction may occur. More specifically, when the area ratio SD/SE is smaller than 0.008 (SD/SE<0.008), the perpendicular magnetic field strength becomes too small, so there is a possibility that recording cannot be stably carried out. On the other hand, when the area ratio SD/SE is larger than 0.3 (SD/SE>0.3), the area SD of the sectional surface DM of the front end portion 11A becomes too small relative to the area SE of the end surface EM of the yoke layer 11, so magnetic flux saturation may occur when the magnetic flux flows from the rear end portion 11B to the front end portion 11A in the yoke layer 11. Therefore, from the viewpoint of preventing the occurrence of the malfunctions, the area ratio SD/SE is preferably within a range of $0.008 \leq SD/SE \leq 0.3$, and more preferably, the area ratio SD/SE is, for example, within a range of $0.009 \leq SD/SE \leq 0.2$, when accuracy of forming the yoke layer 11 is taken into consideration.

As described above, in the thin film magnetic head according to the invention or the method of manufacturing the thin film magnetic head according to the invention, a portion of the pole layer is connected to a portion of the yoke layer, so unlike the case where a portion of the pole layer is connected to the whole yoke layer, when a large amount of the magnetic flux contained in the yoke layer flows into the pole layer, the large amount of the magnetic flux is concentrated. Therefore, an excessive amount of the magnetic flux is not supplied to the pole layer, and an appropriate amount of the magnetic flux is supplied. Accordingly the flow of the magnetic flux from the yoke layer to the pole layer can be appropriately controlled, and information can be prevented from being overwritten without intention during recording.

Moreover, in the thin film magnetic head according to the invention, the yoke layer includes a connecting portion having a part connected to the pole layer, and a yoke widening portion having a large width than the width of the connecting portion, so before the magnetic flux flows into the pole layer, the magnetic flux flowing in the yoke layer is concentrated in the width direction with a decrease in the width of the yoke layer while flowing from the yoke widening portion to the connecting portion, and then the concentrated magnetic flux flows into the pole layer. Therefore, the flow of the magnetic flux flowing from the yoke layer to the pole layer is stabilized, so the flow of the magnetic flux from the yoke layer to the pole layer can be more effectively controlled.

In the thin film magnetic head according to the invention, the area ratio SD/SE between the area SE of the end surface of an end portion in the yoke layer and the area SD of the sectional surface of the connecting portion parallel to the recording-medium-facing surface is within a range of $0.008 \leq SD/SE \leq 0.3$, so the area ratio can be made appropriate. Therefore, while securing the perpendicular magnetic field strength, the leakage magnetic filed strength can be reduced.

Further, in the thin film magnetic head according to the invention, a recession is disposed in at least a part of a portion of the yoke layer except for a portion connected to the pole layer, so before the magnetic flux flows into the pole layer, the magnetic flux flowing in the yoke layer is concentrated in the thickness direction in a portion corresponding to the recession with a decrease in the thickness of the yoke layer. Therefore, by the same effect as in the case where the magnetic flux is concentrated in the width direction with a decrease in the width of the yoke layer, the flow of the magnetic flux from the yoke layer to the pole layer can be more effectively controlled.

Moreover, in the method of manufacturing the thin film magnetic head according to the invention, the pole layer is formed through etching the precursor pole layer to be patterned, and by using the etching process to form the pole layer, at least a part of a portion of the precursor yoke layer pattern except for a portion to be connected to the pole layer is continuously etched to be recessed, thereby the yoke layer is formed, so compared to the case where the etching process for forming the pole layer and the etching process for forming the yoke layer are separately carried out, time and effort required for a preparation for the etching process or the like can be saved. Therefore, the yoke layer can be more easily formed, so the thin film magnetic head can be more easily manufactured.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic recording head, comprising:
a return yoke layer disposed so as to be exposed to a recording-medium-facing surface facing a recording medium;
a yoke layer disposed between the return yoke layer and a main pole so as to be recessed from the recording-medium-facing surface; and
the main pole disposed so as to be exposed to the recording-medium-facing surface,
wherein the main pole includes a pole uniform width portion having a uniform width determining a recording track width of the recording medium and a pole widening portion having a larger width than the width of the pole uniform width portion, and where the pole uniform width portion is closer to the recording-medium-facing surface relative to the pole widening portion,
the yoke layer includes a connecting portion having a uniform width larger than the width of the pole uniform width portion and smaller than the width of the pole widening portion and a yoke widening portion having a width larger than the width of the connecting portion, and where the connecting portion is closer to the recording-medium-facing surface relative to the yoke widening portion, and
a portion of the pole widening portion in the main pole is connected to at least a portion of the connecting portion in the yoke layer.

2. The perpendicular magnetic recording head according to claim 1, wherein
a recess is disposed in a portion of the yoke layer away from where the yoke layer is connected to the main pole.

* * * * *